(12) United States Patent
Liu et al.

(10) Patent No.: US 11,243,087 B2
(45) Date of Patent: Feb. 8, 2022

(54) DEVICE AND METHOD FOR PROVIDING CONTENT TO USER

(71) Applicant: Samsung Electronics Co., Ltd., Gyeonggi-do (KR)

(72) Inventors: Weimin Liu, Beijing (CN); Xiaohui Xu, Beijing (CN); Qingli Zhang, Beijing (CN)

(73) Assignee: Samsung Electronics Co., Ltd

( * ) Notice: Subject to any disclaimer, the term of this patent is extended or adjusted under 35 U.S.C. 154(b) by 146 days.

(21) Appl. No.: 16/811,779

(22) Filed: Mar. 6, 2020

(65) Prior Publication Data

US 2020/0209004 A1  Jul. 2, 2020

Related U.S. Application Data

(63) Continuation of application No. 15/515,035, filed as application No. PCT/KR2015/010237 on Sep. 25, 2015, now Pat. No. 11,092,454.

(30) Foreign Application Priority Data

Sep. 28, 2014 (CN) .......................... 201410510784.2
Aug. 7, 2015 (CN) .......................... 201510484926.7

(51) Int. Cl.
  *G01C 21/34* (2006.01)
  *G06Q 50/10* (2012.01)
  (Continued)

(52) U.S. Cl.
  CPC ....... *G01C 21/3476* (2013.01); *G01C 21/362* (2013.01); *G01C 21/3614* (2013.01);
  (Continued)

(58) Field of Classification Search
  CPC ............ G01C 21/3476; G01C 21/3614; G01C 21/362; G01C 21/3682; G06Q 50/10;
  (Continued)

(56) References Cited

U.S. PATENT DOCUMENTS 9,702,711 B2   7/2017 Tang et al.
2006/0074883 A1  4/2006 Teevan et al.
(Continued)

FOREIGN PATENT DOCUMENTS

CN   101601025   12/2009
CN   101917664   12/2010
(Continued)

OTHER PUBLICATIONS

Chinese Office Action dated Jan. 20, 2020 issued in counterpart application No. 201510484926.7, 31 pages.
(Continued)

*Primary Examiner* — Alan D Hutchinson
(74) *Attorney, Agent, or Firm* — The Farrell Law Firm, P.C.

(57) ABSTRACT

Provided are an electronic device and method for providing content to a user. The method includes, based on text of the user, obtaining content corresponding to the text and being adaptive to the user, wherein the obtained content is adaptive to the user based on information regarding the user, which is collected based on the user's behavior on the electronic device; and providing the obtained content to the user.

20 Claims, 23 Drawing Sheets

(51) Int. Cl.
  *G06Q 10/02* (2012.01)
  *G01C 21/36* (2006.01)
  *H04H 20/57* (2008.01)
  *H04H 60/64* (2008.01)
  *H04H 60/70* (2008.01)
  *H04W 4/021* (2018.01)
  *H04W 4/02* (2018.01)

(52) U.S. Cl.
  CPC ....... *G01C 21/3682* (2013.01); *G06Q 10/025* (2013.01); *G06Q 50/10* (2013.01); *H04H 20/57* (2013.01); *H04H 60/64* (2013.01); *H04H 60/70* (2013.01); *H04W 4/022* (2013.01); *H04W 4/023* (2013.01); *H04W 4/025* (2013.01)

(58) Field of Classification Search
  CPC ...... G06Q 10/025; H04H 20/57; H04H 60/64; H04H 60/70; H04W 4/022; H04W 4/023; H04W 4/025
  See application file for complete search history.

(56) References Cited

U.S. PATENT DOCUMENTS

| | | |
|---|---|---|
| 2008/0163073 A1 | 7/2008 | Becker et al. |
| 2010/0153488 A1 | 6/2010 | Mittal et al. |
| 2010/0332324 A1 | 12/2010 | Khosravy et al. |
| 2014/0006408 A1 | 1/2014 | Rae et al. |
| 2015/0213088 A1 | 7/2015 | Joshi |
| 2015/0278298 A1 | 10/2015 | Boldyrev |
| 2016/0003637 A1 | 1/2016 | Anderson |

FOREIGN PATENT DOCUMENTS

| | | |
|---|---|---|
| CN | 103914536 | 7/2014 |
| CN | 104035947 | 9/2014 |
| ER | 2 706 487 | 3/2014 |
| JP | 201253922 | 3/2012 |
| KR | 1020130053021 | 5/2013 |
| KR | 101322821 | 10/2013 |
| KR | 1020140088345 | 7/2014 |
| WO | WO 2014/072767 | 5/2014 |

OTHER PUBLICATIONS

Chinese Office Action dated Jul. 7, 2020 issued in counterpart application No. 201510484926.7, 12 pages.
CN Decision of Rejection dated Dec. 9, 2020 issued in counterpart application No. 201510484926.7, 13 pages.
European Search Report dated Jan. 20, 2021 issued in counterpart application No. 20207858.0-1222, 10 pages.
PCT/ISA/210 Search Report dated Jan. 14, 2016 issued on PCT/KR2015/010237, 5 pages.
PCT/ISA/237 Written Opinion dated Jan. 14, 2016 issued on PCT/KR2015/010237, 16 pages.
Kadri Sylejmani et al., "A Survey on Tourist Trip Planning Systems", XP05556961, International Journal of Arts & Sciences, Apr. 30, 2011, 15 pages.
European Search Report dated Mar. 7, 2019 issued in counterpart application No. 15844111.3-1222, 6 pages.
David Nadeau et al., "A Survey of Named Entity Recognition and Classification", Jan. 1, 2009, 20 pages.
Jenny Rose Finkel et al., "Incorporating Non-Local Information into Information Extraction Systems by Gibbs Sampling", Jan. 1, 2005, 8 pages.
European Search Report dated Jun. 19, 2017 issued in counterpart application No. 15844111.3-1958, 7 pages.

DEVICE AND METHOD FOR PROVIDING CONTENT TO USER

CROSS-REFERENCE TO RELATED APPLICATION(S)

This application is a Continuation Application of U.S. patent application Ser. No. 15/515,035, which was filed in the U.S. Patent and Trademark Office on Mar. 28, 2017, which is a National Phase Entry of PCT International Application No. PCT/KR2015/010237, which was filed on Sep. 25, 2015, and claims priority to Chinese Patent Application Serial Nos. 201410510784.2 and 201510484926.7, which were filed in the Chinese Patent Office on Sep. 28, 2014 and Aug. 7, 2015, respectively, the entire content of each of which is incorporated herein by reference.

BACKGROUND

1. Field

The present disclosure relates to an apparatus and method for providing contents to users, and more particularly, to an apparatus and method for providing content related to a point of interest (POI) of a user.

2. Description of the Related Art

With advances in internet technology (IT), types of content exchanged in communication networks have become increasingly varied, and users' dependence on a web space has become greater. As the amount of content accessible to users through the web becomes greater, technology for efficiently providing content to users is increasingly required.

An electronic device may automatically identify keywords, such as phone numbers or website links, in text of short messages, web pages, or e-mails. The electronic device may highlight the identified phone numbers or website links to provide corresponding services to users. The user may select the highlighted phone numbers or website links, and corresponding services may be performed by the electronic device. For example, a user may make a phone call by selecting a phone number in a text message, or enter a website by selecting a website link in an e-mail. This provides great convenience to users.

However, types of identifiable keywords are limited, and corresponding services are relatively monotonous. Identifiable keywords may include a phone number, a website link, etc. Text messages may include information which may be of interest to a user. For example, such information may be in regard to a location such as a restaurant, hospital, shopping mall, etc. However, such information or a user's personal circumstances may not be provided or taken into account.

Therefore, a technology for efficiently providing content to users is needed.

SUMMARY

The disclosure is provided to address at least the problems and/or disadvantages described above and to provide at least the advantages described below.

According to an exemplary embodiment, provided is an electronic device for providing content to a user, the electronic device including: a display configured to display text and a point of interest (POI) of a user, the POI being determined based on the text; a processor configured to acquire content corresponding to the POI and adaptive to the user based on a user input with regard to the POI, wherein the display is further configured to display the acquired content.

The content includes service content corresponding to the POI and being determined based on information regarding the user.

The information includes information regarding a schedule of the user collected through at least one from among a schedule management application in the electronic device and a cloud schedule management application, and the service content is adaptive to the schedule of the user.

The service content is adjusted based on the schedule of the user.

The electronic device further includes a communication interface configured to communicate with another user, the text is conversation text between the user and the other user, the information includes context information of the conversation text, and the service content is adaptive to the context information.

The service content is adjusted based on the context information that is changed according to an update of the conversation text.

The information includes at least one from among location information, profile information, contact information, behavior history information, and social relationship information of the user.

The service content includes at least one from among route guide service content, a reservation service content, and surrounding guide content.

The POI is determined based on information regarding the user, included in the text.

The text is conversation text between the user and another user, and the POI is determined based on a context of the conversation text.

The content is adaptive to weather information.

The content includes a plurality of service contents in time sequence.

The POI is a combination of a key word and an ancillary word identified in the text, the key word includes at least one from among a location name and a store name, the ancillary word includes a region name, and the POI is selected from a plurality of POI candidates.

According to an exemplary embodiment, provided is a method of providing a content to a user, the method including: displaying text and a point of interest (POI) of a user, the POI being determined based on the text; acquiring a content corresponding to the POI and being adaptive to the user based on a user input with regard to the POI; and displaying the acquired content.

The content includes service content corresponding to the POI and being determined based on information regarding the user.

The POI is determined based on information regarding the user, included in the text.

The content includes a plurality of service contents in time sequence.

The POI is a combination of a key word and an ancillary word identified in the text, the key word includes at least one from among a location name and a store name, the ancillary word includes a region name, and the POI is selected from a plurality of POI candidates.

According to an exemplary embodiment, provided is a computer-readable recording medium having recorded thereon a program executable by a computer for performing the provided method.

According to an exemplary embodiment, provided is a server for providing a content to a user, the server including: a communication interface configured to receive text from an electronic device of a user; a processor configured to determine a point of interest (POI) of the user in the text, and to generate a content corresponding to the POI and being adaptive to the user, wherein the communication interface is further configured to transmit the generated content to the electronic device.

In accordance with an aspect of the disclosure, an electronic device is provided for providing content to a user. The electronic device includes at least one processor; and a memory storing instructions, which when executed, control the at least one processor to, based on text of the user, obtain content corresponding to the text and, being adaptive to the user, wherein the obtained content is adaptive to the user based on information regarding the user, which is collected based on the user's behavior on the electronic device, and provide the obtained content to the user.

In accordance with another aspect of the disclosure, a method is provided for providing content to a user at an electronic device. The method includes, based on text of the user, obtaining content corresponding to the text and being adaptive to the user, wherein the obtained content is adaptive to the user based on information regarding the user which is collected based on the user's behavior on the electronic device; and providing the obtained content to the user.

In accordance with another aspect of the disclosure, a first electronic device is provided for providing content to a user. The first electronic device includes a communication interface; and at least one processor configured to receive, through the communication interface, text from a second electronic device of the user, based on the received text, generate content corresponding to the text and being adaptive to the user based on information regarding the user which is collected based on the user's behavior on the second electronic device, and transmit the generated content to the second electronic device through the communication interface.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
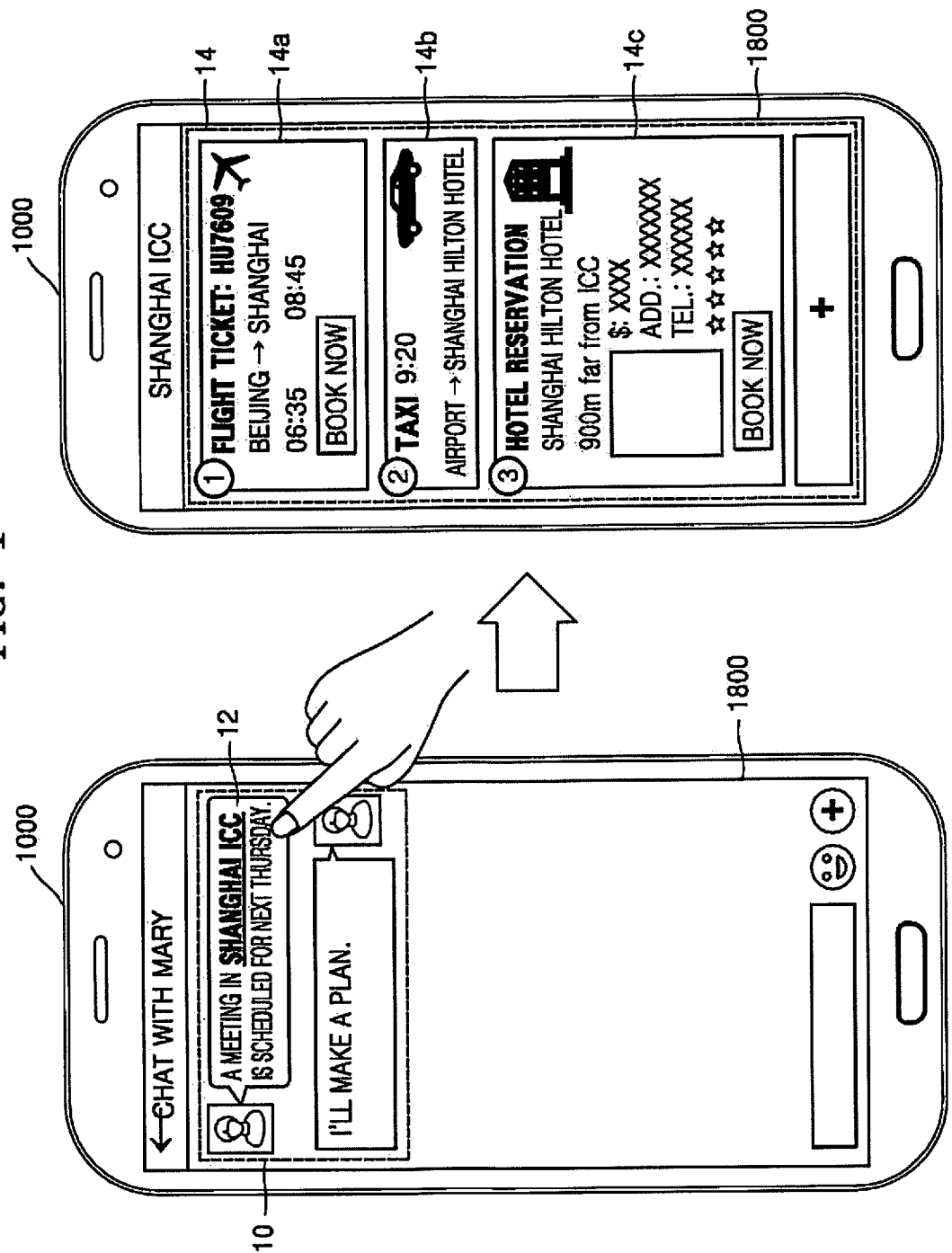
FIG. 1 illustrates example content that is adaptive to a user.

Reference will now be made in detail to embodiments, examples of which are illustrated in the accompanying drawings. In this regard, the present embodiments may have different forms and should not be construed as being limited to the descriptions set forth herein. However, the exemplary embodiments may be realized in different forms, and are not limited to the embodiments in the present disclosure. In the accompanying drawings, like reference numerals refer to like elements throughout.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description. Thus, the terms used herein have to be defined based on the meaning of the terms together with the description throughout the specification.

As used herein, the singular forms "a", "an" and "the" are intended to include the plural forms as well, unless the context clearly indicates otherwise. It should be understood that the terms "comprises," "comprising," "including," and "having" are inclusive and therefore specify the presence of stated features or components, but do not preclude the presence or addition of one or more other features or components. Numbers described herein are examples provided to help with understanding, and embodiments should not be limited to the numbers.

In the present disclosure, terms, such as " . . . unit" or " . . . module", should be understood as a unit in which at least one function or operation is processed. A component termed as " . . . unit" or " . . . module" may be embodied as hardware, software, or a combination of hardware and software.

It should be understood that, although the terms "first," "second," etc. may be used herein to describe various elements, and these elements should not be limited by these terms. These terms are used to distinguish one element from another. For example, a first element may be termed a second element within the technical scope of an exemplary embodiment.

Terms used herein will now be briefly described and then one or more exemplary embodiments will be described in detail.

In the present disclosure, an electronic device may be a smartphone, tablet computer, mobile phone, personal digital assistant (PDA), media player, portable multimedia player (PMP), e-book terminal, digital broadcasting terminal, electronic bulletin board, personal computer (PC), laptop computer, micro-server, global positioning system (GPS) device, navigation device, kiosk, MP3 player, analog television (TV), digital TV, three-dimensional (3D) TV, smart TV, light-emitting diode (LED) TV, organic light-emitting diode (OLED) TV, plasma TV, monitor, curved TV including screen having a fixed curvature, flexible TV including a screen having a fixed curvature, bended TV including a screen having a fixed curvature, curvature-variable TV where a curvature of a screen is adjustable according to a received user input, digital camera, wearable device and other mobile device capable of being worn on a body of a user, and non-mobile computing device, but is not limited thereto.

In the present disclosure, a wearable device may be a watch, bracelet, ring, glasses, and hair band, but is not limited thereto.

In the present disclosure, a point of interest (POI) may be referred to as a certain point, store, branch, location, product, video, or music that interests people. A name of the certain point, store, branch, location, product, video, or music may be referred to as the POI. For example, the POI may correspond to a name of a branch such as "KFC", "McDonald's", and "Citibank", or a location such as "Olympic Park", "Shanghai ICC", "Seoul Tower", "National Medical Center", "Samsung Hospital", and "International Convention Center", or a product such as "LEGO", "Coca-Cola", "Galaxy", and "Gear", video such as "Avatar", "Mission Impossible", and "007", or music such as "Let it be", "Gangnam Style", and "Beat it." However, the POI is not limited thereto.

In the present disclosure, content may be referred to as an object that is visualized based on data, or the data itself. The content may include text and background. The content may include an image and video. The content may be distributed or shared by networks in an electronic form. The content may be web-based content, and displayed by an internet browser. The content may be application-based content, and displayed by an application. The content is not limited thereto, and may be produced and displayed in various ways. Furthermore, the content may include a graphic user interface (GUI) for interaction with a user, and details of the content may be displayed in the GUI. A menu for receiving a user input may be displayed.

For convenience of explanation, it is assumed herein that the electronic device is a smartphone.

FIG. 1 illustrates example content that is adaptive to a user.

A screen of a chatting application is illustrated in FIG. 1. Embodiments may be embodied by various applications executed in an electronic device 1000.

Referring to FIG. 1, the screen of the chatting application where a user of an electronic device and a user named "Mary" chat with each other is displayed on a display 1800 of the electronic device 1000. Conversation text 10 between users may include a text message received from a user and a text message transmitted to the user.

When the conversation text 10 includes a name of a location such as "Shanghai ICC", "Shanghai ICC" may be determined as a point of interest (POI) 12. According to an exemplary embodiment, the electronic device may perform database (DB) matching on the conversation text 10 with respect to a database where information regarding POIs is stored by searching for a matched word for the POI 12. The database where the information regarding POIs is stored may be included in the electronic device 1000, or may be included in a server. A method of determining the POI in text is explained by referring to FIG. 13 and FIG. 14 later.

According to an exemplary embodiment, the POI 12 determined in text may be displayed in underlined and bold format to lure a user to select it. The POI 12 may be displayed in various ways, such as, using a different text format or color from the rest of the text, so that the POI 12 may be distinguished in the text.

When a user input with regard to "Shanghai ICC" of the POI 12, the electronic device 1000 may display content 14 corresponding to the POI 12 and that is adaptive to a user.

According to an exemplary embodiment, the electronic device 1000 may acquire and display service content necessary for an itinerary from a current location of a user to the POI 12.

For example, flight service content 14a for flying from a current location of a user to an airport of a region where the POI 12 is located, taxi service content 14b for driving from the airport to a hotel near the POI 12, and hotel service content 14c for staying at the hotel near the POI 12 may be displayed.

According to an exemplary embodiment, time for a user to search information regarding a POI may be reduced by identifying the POI of the user in displayed text and displaying content corresponding to the identified POI.

In response to a user input, the electronic device 1000 may increase the number of contents displayed. For example, a "+" shaped button may be displayed on the display 1800 as illustrated in FIG. 1, and additional content may be acquired and displayed in response to an input to the button. The user input may be received by a handwriting input or voice input. For example, in response to a voice input of "from the hotel to XX park", the electronic device 1000 may acquire and display transportation service content for transportation from the hotel to the XX park.

Figure 2:
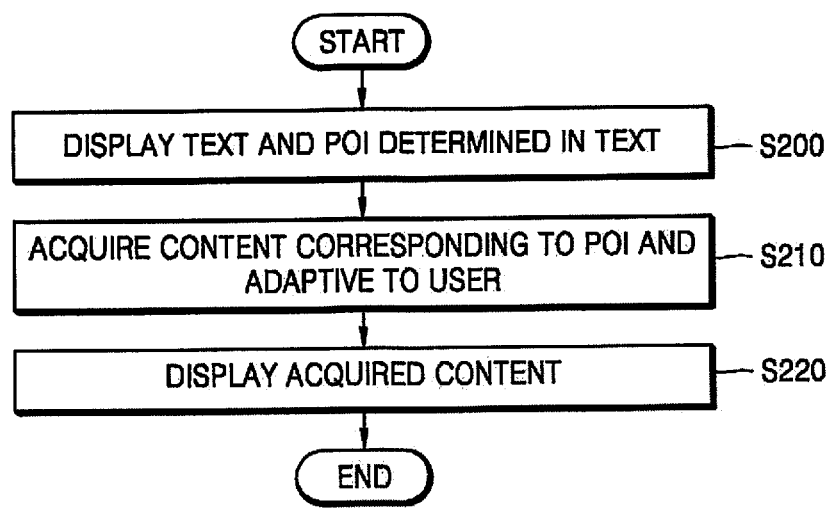
FIG. 2 illustrates a flowchart of a method of providing content to a user by using an electronic device, according to an exemplary embodiment.

FIG. 2 illustrates a flowchart of a method of providing content to a user by using an electronic device, according to an exemplary embodiment.

The flowchart will be further explained by referring to FIG. 1.

In operation S200, the electronic device 1000 may display text and a point of interest (POI) of a user determined in the text.

The text may include conversation text between users, such as, a short message, multi-media message, chatting message, e-mail message, etc. For example, a text message application may be executed in the electronic device 1000 to receive text, and the electronic device 1000 may display the text and transmit the text to a message partner. The electronic device 1000 may analyze text that is received by a user in real-time to determine a POI in the text. Similar processes as in the text message application may be performed in a chatting application.

Referring to FIG. 1, a chatting message may be displayed on a chatting application in the display 1800.

A POI may be determined in conversation text by performing DB matching or semantic analysis on the conversation text.

In the present disclosure, a POI may be referred to as a certain point, store, branch, location, product, video, or music that interests people. A name of the certain point, store, branch, location, product, video, or music may be referred to as the POI.

For example, "Shanghai ICC" may be determined as a POI 12 in conversation text 10 as illustrated in FIG. 1.

The determined POI 12, that is, "Shanghai ICC" may be displayed in underlined and bold format as illustrated FIG. 1 to be distinguished in the conversation text 10. The POI 12 may be displayed in various ways.

In an exemplary embodiment, a POI may be determined based on audio data, picture data, or video data. For example, when the electronic device 1000 receives audio data, such as a voice saying, "A meeting in Shanghai ICC is scheduled for next Thursday", the electronic device 1000 may perform speech recognition on the received audio data to convert it to text. The electronic device 1000 may determine "Shanghai ICC" as a POI in the text converted from the received audio data. When the electronic device 1000 receives picture data including text of "A meeting in Shanghai ICC is scheduled for next Thursday", the electronic device 1000 may perform character recognition on the received picture data to convert it to text. The electronic device 1000 may determine "Shanghai ICC" as a POI in the text converted from the received picture data.

In operation S210, the electronic device 1000 may acquire a content corresponding to the displayed POI and that is adaptive to the user, in response to a user input with regard to the displayed POI.

In an exemplary embodiment, the electronic device 1000 may generate the content corresponding to the POI and adaptive to the user, or receive the content from an external device or a server, or extract the content from a plurality of contents.

Here, types of the content may be distinguished based on its details. Details of service content may include a subject, expected starting time, expected ending time, expected time period, or specification of a service, but is not limited thereto.

In an exemplary embodiment, service content corresponding to the POI may include transportation service content for providing information about transportation from a current location to the POI, and accommodation service content for providing information about accommodation near the POI. The transportation service content and accommodation service content may respectively include reservation service content for making a reservation with respect to the transportation and accommodation service content.

In an exemplary embodiment, the transportation service content may include inter-regional transportation service content for providing information about transportation from one state, province, or city to another, and regional transportation service content for providing information about transportation within the same region, such as, the same state, province, or city. The inter-regional transportation service content may include flight service content, train service content, or ship service content, but is not limited thereto. The regional transportation service content may include taxi service content, subway service content, or intra-city bus service content, but is not limited thereto.

Referring to FIG. 1, when a current location of a user is Beijing and the POI 12, that is "Shanghai ICC", is located in Shanghai, the inter-regional transportation service content for transportation from Beijing Airport to Shanghai Airport, such as the flight service content 14a, may be acquired and displayed. The flight service content 14a may provide information regarding a flight number, departure time, arrival time, origin, and destination of a flight.

Furthermore, regional transportation service content for transportation from the Shanghai Airport to a hotel near the POI 12, such as the taxi service content 14b may be acquired and displayed. The taxi service content 14b may provide information regarding an expected departure time, expected arrival time, origin, destination.

Furthermore, hotel service content 14c for a reservation of the hotel near the POI may be acquired and displayed. The hotel service content 14c may provide information regarding a check-in time, check-out time, location, price, address, and telephone number of a hotel.

According to an exemplary embodiment, content may have a time sequence. For example, each of the contents 14a, 14b, and 14c may have a time sequence according to an itinerary from a current location of a user to the POI. That is, the flight service content 14a, taxi service content 14b, and hotel service content 14c may be arranged in a time sequence based on an itinerary including flight transportation from the Beijing Airport to the Shanghai Airport, taxi transportation from the Shanghai Airport to the hotel near the POI 12, and staying at the hotel near the POI 12. A priority of contents 14a, 14b, and 14c may differ based on the time sequence, and details of each of the contents 14a, 14b, and 14c may be arranged in the time sequence. Referring to FIG. 1, when a departure time and arrival time of a flight provided by the flight service content 14a are respectively determined as 06:35 and 08:45, an expected departure time of a taxi provided by the taxi second 14b may be determined as 09:20, and a check-in time of a hotel may be determined based on an expected arrival time of the taxi. As described above, details of each of the contents 14a, 14b, and 14c may be arranged in the time sequence based on the itinerary.

In an exemplary embodiment, content may correspond to a POI of a user and be acquired based on information regarding the user.

The information regarding a user may include information about a location, itinerary, conversation text, context thereof, profile, behavior history, social relationship, contact, emotion, fatigability, and health condition of the user, but is not limited thereto.

For example, referring to FIG. 1, when the conversation text 10 including the context of "next Thursday" is received at Friday of 24th July 2015, contents 14 may be acquired with respect to the next Thursday of 30th July 2015. That is, service contents 14 for transportation and reservation at 30th July 2015 may be acquired and displayed.

In operation S220, the electronic device may display the content acquired in operation S210.

The acquired content may be displayed by a GUI where the POI has been displayed, by another GUI, or by another application.

In an exemplary embodiment, when a plurality of contents are acquired, the plurality of contents may be arranged and displayed in a time sequence on the display 1800 of the electronic device 1000. For example, as illustrated FIG. 1, the flight service content 14a, taxi service content 14b, and hotel service content 14c may be arranged and displayed in a time sequence based on an itinerary including flight transportation from the Beijing Airport to the Shanghai Airport, taxi transportation from the Shanghai Airport to the hotel near the POI 12, and staying at the hotel near the POI 12.

According to an exemplary embodiment, processes for searching for the POI and making a reservation regarding the POI may be simplified by contents adaptive to a user's itinerary.

In an exemplary embodiment, service content may be adaptive to a schedule of a user. A schedule of a user may be acquired from a schedule management application of the electronic device, or a cloud schedule management application.

For example, when a schedule management application of the electronic device 1000 has a schedule of a meeting in "Shanghai ICC" at 14:00 29th July 2015 for a user, flight service content for providing a reservation of a flight from Beijing to Shanghai departing at 06:35 may be acquired and displayed on the electronic device 1000. For example, when a schedule management application of the electronic device 1000 has a schedule of a meeting in "Shanghai ICC" at 09:00 29th July 2015 for a user, flight service content for providing a reservation of a flight from Beijing to Shanghai departing at afternoon of 28th July 2015 may be acquired and displayed on the electronic device 1000.

In an exemplary embodiment, a schedule of a user may be acquired based on text such as conversation text between users, such as, a short message, multi-media message, chatting message, e-mail message, etc.

For example, a schedule of a meeting in "Shanghai ICC" at 14:00 29th, July 2015 may be acquired from chatting messages between users, the chatting messages indicating or implying the schedule of the meeting. For example, a schedule of a meeting in "Shanghai ICC" at 14:00, 29th of July 2015 may be acquired from an e-mail message reminding a user of his schedule.

In an exemplary embodiment, a schedule of a user may be acquired by performing character recognition on an image including a user's schedule.

According to an exemplary embodiment, when a schedule of a user acquired from a certain source is different than one from another source, for example, a schedule management application has a schedule of a class from 14:00 to 16:00 and conversation text between users includes a meeting at 15:00 in "Shanghai ICC", the electronic device 1000 may generate a notification of a conflict between schedules. For example, the electronic device 1000 may have the notification appear as a pop-up or display the notification via a notification bar. According to an exemplary embodiment, each schedule acquired from different sources may have a different priority. For example, a schedule from conversation text between users may have a priority over one from a schedule management application. Here, the electronic device 1000 may acquire service content for attending a meeting at 15:00 at "Shanghai ICC" based on the conversation text. The electronic device 1000 may display the notification of the conflict via a pop-up or a notification bar in response to a user input with regard to the POI "Shanghai ICC", an entry asking the user whether to provide service content corresponding to the POI, or asking the user whether to provide service content related to the user's schedule may be displayed or played in audio. The entry may be in the form of keys.

The service content related to the user's schedule may be embodied by using a schedule management application or an application programming interface provided by a schedule management website.

Figure 3:
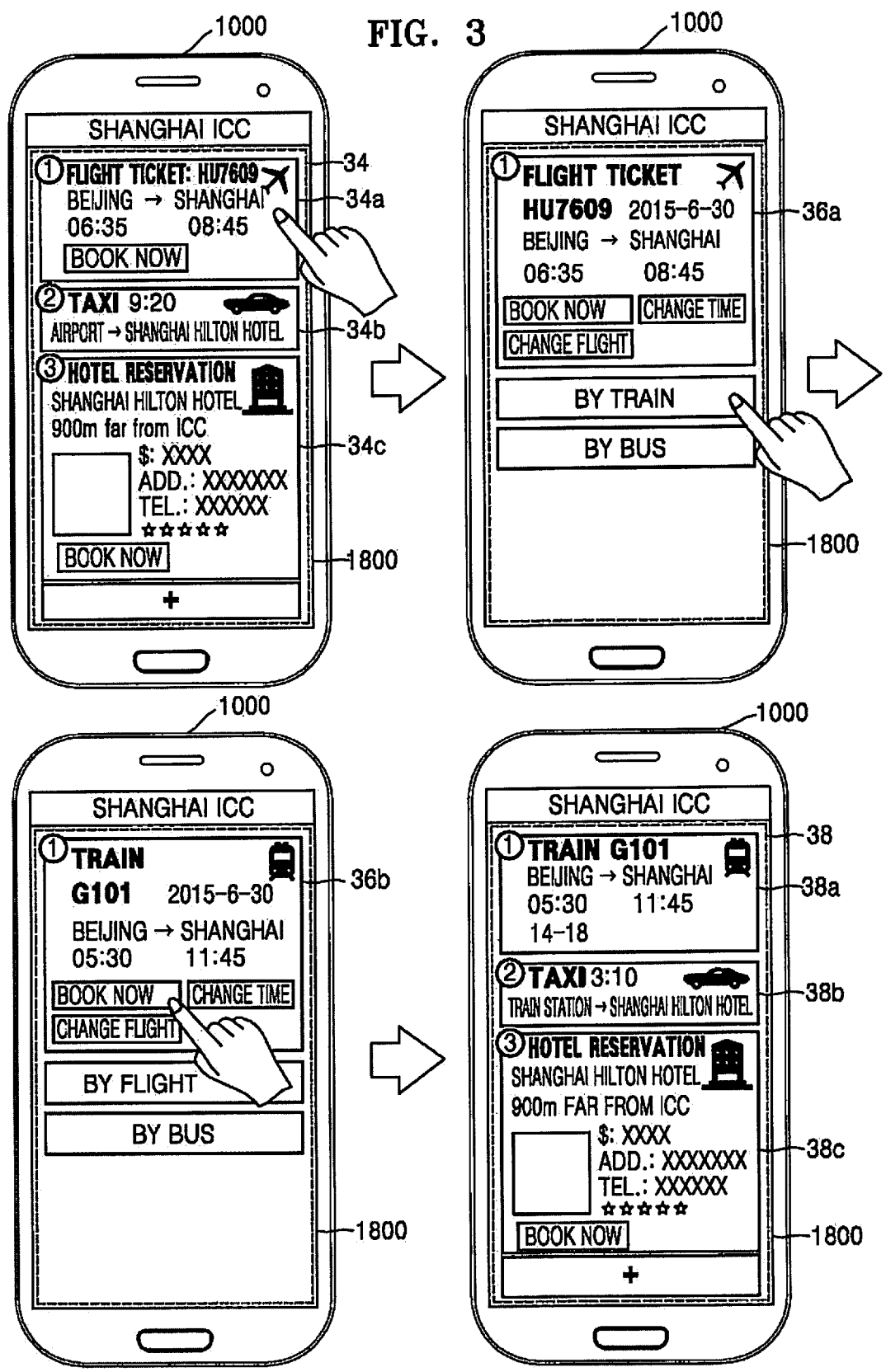
FIG. 3 illustrates an example interaction between a user and content corresponding to a point of interest (POI) of the user.

FIG. 3 illustrates an example interaction between a user and content corresponding to a point of interest (POI) of the user.

In response to user inputs with regard to contents 34a, 36a, and 36b as illustrated in FIG. 3, the electronic device 1000 may interact with a user.

In response to a user input with regard to the POI, a plurality of contents 34 corresponding to the POI and adaptive to a user may be displayed, the contents 34 including flight service content 34a, taxi service content 34b, and hotel service content 34c. The flight service content 34a is of inter-regional transportation service content, taxi service content 34b is of regional transportation service content, and hotel service content 34c is of accommodation service content.

In an exemplary embodiment, details of the contents 34 and a menu for receiving a user input may be displayed by a GUI of the contents 34. For example, the displayed flight service content 34a may include details such as a flight number, origin, destination, departure time, and arrival time of a flight, and a menu such as "Book Now" as illustrated in the upper left of FIG. 3. A background of the flight service content 34a may function as another menu such as "Show Details." In response to a user input with regard to the menu of "Show Details", the electronic device 1000 may display details and other menus as illustrated in the upper right of FIG. 3 Other menus may include "Change time", "Change flight", "By train", and "By bus" as illustrated in the upper right of FIG. 3.

In response to a user input of selecting a menu of "By train" in the flight service content 36a, train service content 36b may be displayed instead of the flight service content 34a as illustrated in the lower left of FIG. 3. That is, a subject may be changed in service content. As a subject is changed from flight to train in the service content, details of a train such as a train number, origin, destination, departure time, and arrival time of the train may be displayed in the train service content 36b, and menus such as "Book Now", "Change time", "Change train", "By flight", "By bus" may be displayed together.

The details of the train service content 36b may be determined based on the details of the flight service content 36a. For example, a train corresponding to a departure time and arrival time of a flight may be determined. Otherwise, a train may be determined based on a schedule of a user.

In response to a user input selecting a menu of "Book Now" in the train service content 36b, a request to book a train ticket may be transmitted to a train reservation server. The booking of a train ticket may be embodied by using a train reservation application or an application programming interface provided by a train reservation website.

According to an exemplary embodiment, when details of service content are changed among a plurality of service contents, details of other service contents may be changed accordingly.

For example, referring to FIG. 3, when a subject is changed from a flight to a train in inter-regional transportation service content 36a, details of other service contents such as regional transportation service content and accommodation service content may be changed accordingly. As the time of arrival at Shanghai is changed, a departure time of a taxi may be changed in the taxi service content 38b. As a destination at Shanghai is changed from Shanghai Airport to Shanghai train station, details, such as an origin, of the taxi service content 38b may be changed accordingly.

In an exemplary embodiment, service content may be displayed in a way to distinguish whether details of the service content are adjusted, whether adjustment of the details is automatic or manual, or whether a reservation is made.

For example, service content may be displayed in a certain color, or a background of the service content may be displayed in a certain color, or an indicator may be displayed at or adjacent to the service content. Referring to FIG. 3, a background of the train service content 38a may be displayed in a first color when a train is booked, or an indicator such as "Confirmed" may be displayed at or adjacent to the train service content 38a. A background of the taxi service content 38b may be displayed in a second color when details thereof are adjusted, or an indicator such as "Adjusted" may be displayed at or adjacent to the taxi service content 38b. A background of the hotel service content 38c may be displayed in a third color, or an indicator such as "Need Reservation" may be displayed at or adjacent to the hotel service content 38c. Various indicators may be displayed, for example, "Need Confirm", "Newly Added", "Completed", but is not limited thereto.

According to an exemplary embodiment, processes for searching for the POI and making a reservation regarding the POI may be simplified by allowing details of content to be adjusted based on adjustment of details of other content.

Figure 4:
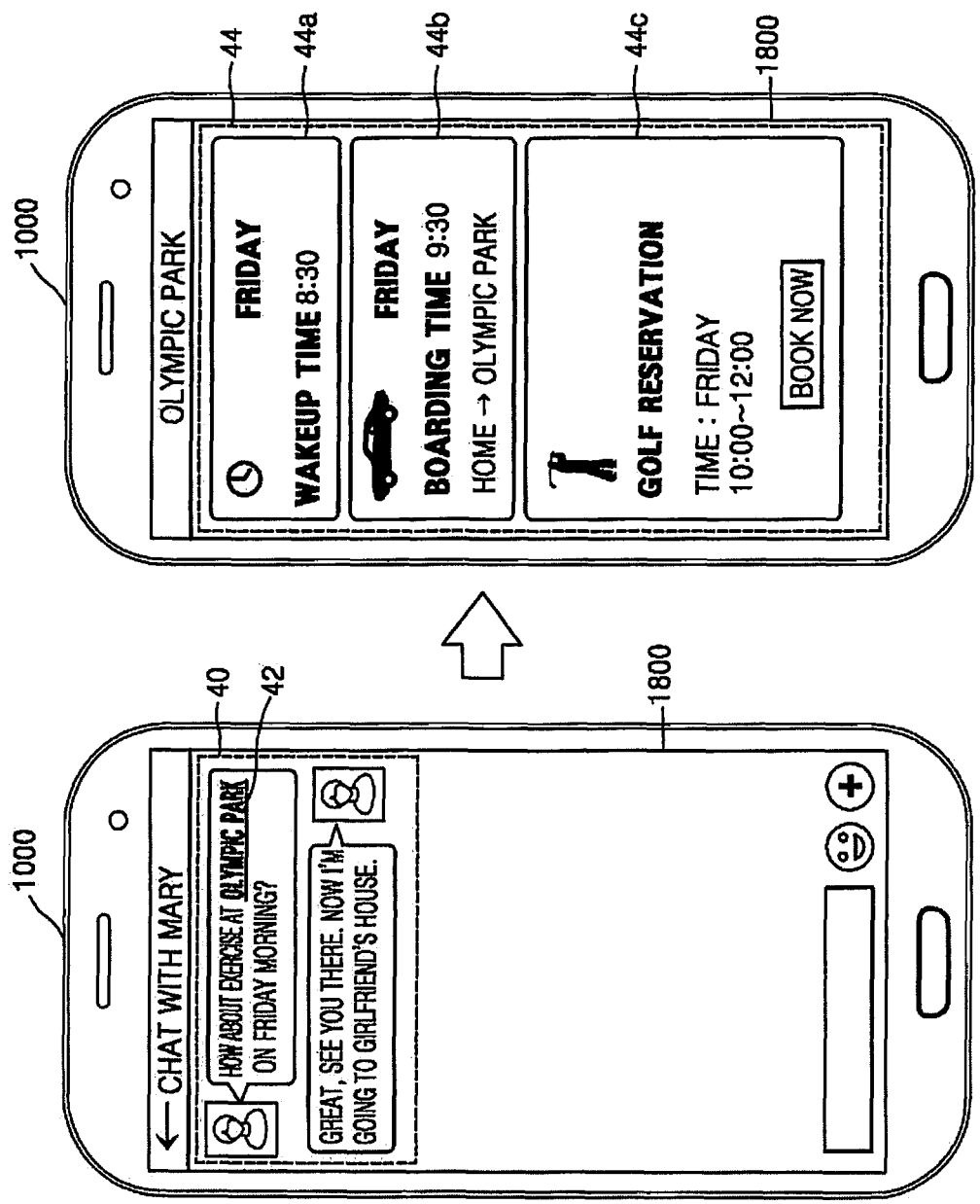
FIG. 4 illustrates example content determined based on information regarding a user.

FIG. 4 illustrates other example content determined based on information regarding a user.

In an exemplary embodiment, content may correspond to a POI of a user and be acquired based on information regarding the user.

The information regarding a user may include information about a location, itinerary, conversation text, context thereof, profile, behavior history, social relationship, contact, emotion, fatigability, and health condition of the user, but is not limited thereto. Information about a location, emotion, fatigability, and health condition of the user may be directly or indirectly collected by the electronic device 1000. For example, the information may be collected by a sensor of the electronic device 1000, or by analyzing an image captured by a camera of the electronic device 1000.

As illustrated in FIG. 4, when "Olympic Park" is determined as a POI 42 in conversation text 40 between users, the electronic device 1000 may provide sport reservation service content 44c based on context of the conversation text 40.

The sport reservation service content 44c may include information regarding details such as a type of a sport, play location, play time, etc.

In an exemplary embodiment, the electronic device may determine which sport reservation service content is provided to a user based on information regarding the user, such as an interest, health condition, behavior history of the user. Furthermore, the electronic device 1000 may further refer to information provided by a POI, weather information, etc.

The information regarding an interest of a user may be received by the user directly. The information regarding an interest of a user may be generated or determined based on information about a behavior history such as an activity that the user participates in, a product that the user buys, an article that the user reads. The information regarding an interest of a user may be determined based on profile information of the user, or social relationship information of the user.

For example, when a user often reads an article about golf or buys a book about golf, his behavior history may be analyzed to determine his interest as being golf Information regarding a user collected by the electronic device 1000 may be imported to user account information.

Information regarding a health condition of a user may be collected by a health monitoring device or wearable device detecting blood pressure, heart rate, workout frequency, etc. The electronic device 1000 may provide service content suggesting an appropriate activity for a user based on information regarding the health condition of the user. For example, when it is determined that a user is recovering from illness, the electronic device 1000 may provide the user with service content suggesting an activity having a low activity level. When it is determined that a user has lower activity level, and his physical status has become worse, the electronic device 1000 may provide service content suggesting an activity having a high activity level.

Information regarding a behavior history of a user may be received by a user directly. The information regarding a behavior history of a user may be generated or determined based on a schedule of the user, conversation text between the user and another user, and an activity pattern of the user which may be collected by a wearable device worn by the user. For example, when it is determined, by analyzing recent activities of a user, that the user played basketball three times and table tennis two times in a month, the electronic device 1000 may provide service content regarding a sport which the user is interested in, but has not played recently.

Information regarding a POI may include information regarding a playable sport or activity at the POI. The playable sport or activity at the POI is limited, and service content regarding a sport that is not playable at the POI is not provided to the user. When a POI is determined based on conversation text between users, the electronic device 1000 may provide service content regarding a sport played by a plurality of people or a team, and not provide service content regarding a sport played by one person.

The electronic device 1000 may provide service content based on a combination of various factors. When it is determined, by analyzing past activities and habits of a user, that the user usually plays golf from 10:00 to 12:00, a reservation time may be determined as 10:00 to 12:00 on Friday in golf reservation service content 44c. The electronic device 1000 may allow a user to adjust details of service content, such as a reservation time and specification of a service.

Referring to FIG. 4, when conversation text 40 between users includes "Friday morning", content 44 for the nearest Friday may be acquired and provided to a user. For example, the content 44 may include transportation service content 44b regarding transportation at the nearest Friday morning from a user's home to a POI 42, that is "Olympic Park", and golf reservation service content 44c regarding a golf reservation at the nearest Friday morning.

In an exemplary embodiment, a behavior history of a user may be analyzed to determine transportation from home to the POI 42. In order to analyze a behavior history of a user, the electronic device may collect information regarding the user, such as past schedules, past conversation text, activity patterns, and frequency of using service content of the user. For example, it may be determined that a user uses taxi service content more than bus service content. When it is determined that a user prefers a taxi over a bus, the electronic device 1000 may provide taxi service content rather than bus service content. An expected travel time by a taxi from a user home to the POI 42 may be calculated based on a boarding time and traffic condition at the nearest Friday morning. For example, when the expected travel time is 20 minutes, a boarding time may be determined as 09:30 in the taxi service content 44b to fit with the reservation time for the golf, that is, from 10:00 to 12:00. After the boarding time is determined, the electronic device 1000 may transmit a request of a taxi to a taxi reservation service center or server to ride a taxi before the boarding time.

In an exemplary embodiment, alarm service content 44a may be provided to a user according to the determined boarding time. For example, a wake-up time may be determined as 08:30 of the nearest Friday morning, an hour before the boarding time, in the alarm service content 44a.

As described above, the electronic device 1000 may provide alarm service content 44*a*, taxi service content 44*b*, and golf reservation service content 44*c* to a user according to information regarding interests, behavior history, and health condition of a user, services available at a POI, weather, etc. The alarm service content 44*a*, taxi service content 44*b*, and golf reservation service content 44*c* may be arranged and displayed according to a time sequence determined based on a user's itinerary from home to the POI 42. That is, alarm service content 44*a*, taxi service content 44*b*, and golf reservation service content 44*c* may be arranged in a time sequence based on an itinerary including wake-up, taxi transportation from home to the POI 42, and golf at the POI 42. A priority of contents 44*a*, 44*b*, and 44*c* may differ based on the time sequence, and details of each of the contents 44*a*, 44*b*, and 44*c* may be arranged in the time sequence. Referring to FIG. 4, when a reservation time for golf is determined as from 10:00 to 12:00 on the nearest Friday in the golf reservation service content 44*c*, a boarding time of a taxi is determined as 09:30 on the nearest Friday morning, and then a wake-up time is determined as 08:30 on the nearest Friday morning. As described above, details of each of the contents 44*a*, 44*b*, and 44*c* may be arranged in the time sequence based on the itinerary.

Figure 5:
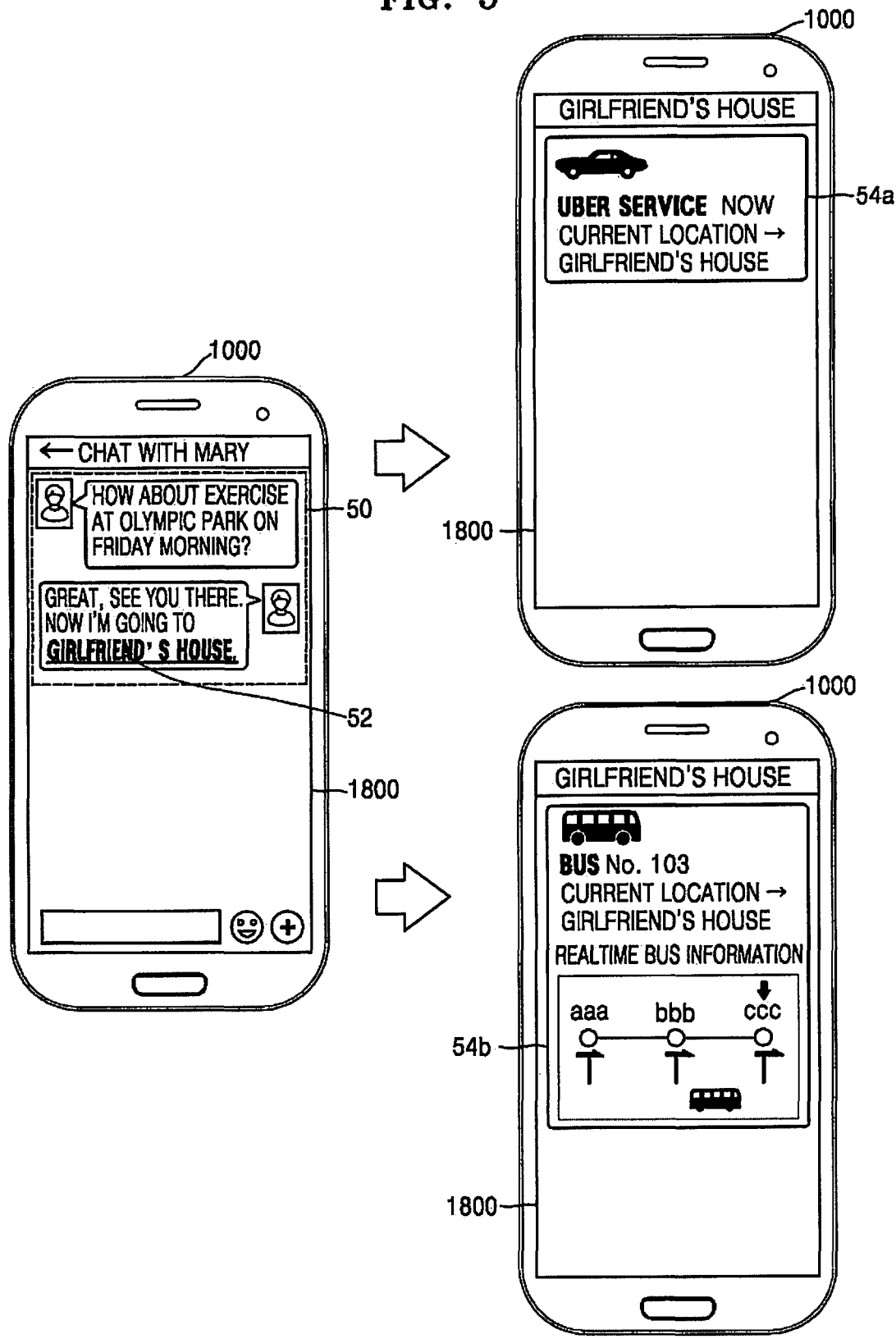
FIG. 5 illustrates other example content determined based on information regarding a user.

FIG. 5 illustrates other example content determined based on information regarding a user.

In an exemplary embodiment, content may correspond to a POI of a user and be acquired based on information regarding the user.

The information regarding a user may include information about a location, itinerary, conversation text, context thereof, profile, behavior history, social relationship, contact, emotion, fatigability, and health condition of the user, but is not limited thereto. Information about a profile of a user may include information regarding an interest, name, age, gender, height, weight, blood type, hobby, occupation, home address, marriage, religion of a user, but is not limited thereto.

Information about a social relationship of a user may include information regarding a family member, lover, coworker, and friend of a user, but is not limited thereto. For example, information regarding coworkers of a user may include information regarding who is a coworker of a user, the number of coworkers of the user, and the number of coworkers communicating with the user more than a certain time during a certain period time, but is not limited thereto. Information about a social relationship of a user may include information about other users, for example, information about a schedule, profile, and location of other users, but is not limited thereto.

Information about other users may be received by a user directly, or collected with the permission of the other users, or determined based on collected information. Contact information of a user may include a telephone number, mobile phone number, company telephone number, home address, company address, e-mail of other users as well as the user.

Referring to FIG. 5, "girlfriend's house" may be determined as a POI 52 in conversation text 50 between users. The POI 52 of "girlfriend's house" may relate to a certain geographical location, for example, "Xiajiayuan Community, Chaoyang District, Beijing City, China", corresponding to "girlfriend's house." Here, information about a girlfriend of a user and her home address may be stored in contact information of the user, or collected based on conversation text between the user and his girlfriend. As similar to determining "girlfriend's house" as a POI, "Zhang Ming's house", "wife's company", "hometown of cousins", "son's school", etc. may be determined as a POI.

In an exemplary embodiment, content corresponding to a POI and adaptive to a user may be determined based on statistics of transportation that the user has used, transportation preferred by the user, travel time of transportation, and schedule, behavior history, and profile of the user, etc. Information about a behavior history of the user may include information regarding past activities of the user, activities completed by the user, the user's feedback to content, and a behavior history with regard to service content provided by the electronic device 1000.

For example, when it is determined that car sharing service content is frequently used by a user to go to a girlfriend's house, the electronic device 1000 may acquire and display the same car sharing service content 54*a* to a user as illustrated in FIG. 5. However, when it is determined that bus service content is frequently used by a user to go to a girlfriend's house, the electronic device 1000 may acquire and display the same bus service content 54*b* to a user as illustrated in FIG. 5. Statistics of transportation that the user has used may be calculated based on the number of times using a transportation service content provided to the user.

In an exemplary embodiment, the electronic device 1000 may acquire and display a transportation service content predetermined or preferred by a user. For example, when a taxi is predetermined as a means of transportation, the electronic device 1000 may acquire and display a taxi service content.

In an exemplary embodiment, which transportation service content is provided to a user may be determined based on a travel time of a means of transportation. For example, service content for a means of transportation having the shortest travel time may be acquired and displayed by the electronic device 1000.

In an exemplary embodiment, a type of taxi, such as a premium taxi or ordinary taxi, may be determined based on history information of a user. For example, when it is determined that the user frequently takes a taxi from a certain company, a taxi service content providing a service of the company may be acquired and displayed by the electronic device 1000. When a coupon of a premium taxi is issued for the user, a premium taxi may be selected and displayed in the taxi service content. History information of the user may include information regarding a history of using service content provided to the user.

In an exemplary embodiment, content corresponding to a POI and adaptive to a user may be determined based on profile information of the user. For example, when a user is female, public transportation service content may be acquired and displayed for a night travel, rather than taxi service content.

In an exemplary embodiment, information regarding a current location of a user, a distance between the current location and a bus stop, a travel time to a destination, etc. may be acquired to provide bus service content to the user. For example, when it is determined that a bus arrives at a bus stop soon, bus service content may be acquired and displayed by the electronic device 1000, rather than other transportation service content. Efficiency of planning may improve according to an exemplary embodiment.

The above standards may be used for inter-regional transportation service content. For example, transportation service content regarding means of transportation that is used frequently by a user may be acquired and displayed. For example, flight service content may be acquired and displayed by the electronic device 1000 when it is determined that a user has taken flights more than other means. Statistics of transportation that the user has used may be calculated based on the number of times using a transportation service content provided to the user.

In an exemplary embodiment, the electronic device 1000 may acquire and display a transportation service content predetermined or preferred by a user. For example, when a flight is predetermined or preferred by the user, flight service content may be acquired and displayed by the electronic device 1000.

In an exemplary embodiment, which transportation service content is provided to a user may be determined based on a travel time of a means of transportation. For example, service content for a means of transportation having the shortest travel time may be acquired and displayed by the electronic device 1000.

In an exemplary embodiment, a flight service content providing a reservation for a flight from a departure time preferred or taken frequently by a user may be acquired and displayed based on history information regarding flights that the user has taken. In an exemplary embodiment, a flight service content providing a reservation for a flight with a price preferred or bought frequently by a user may be acquired and displayed based on history information regarding flights that the user has taken.

In an exemplary embodiment, when a schedule of a user indicates of a meeting in "Shanghai ICC" at 14:00 on 29th July 2015, a flight service content providing a reservation for a flight in the morning of 29th July 2015 may be acquired and displayed. When it is further determined that the user frequently takes a flight from Beijing at 06:00 or 07:00 based on history information regarding flights that the user has taken, a flight service content providing a reservation of flight having a departure time between 06:00 and 07:00 may be acquired and displayed.

Figure 6:
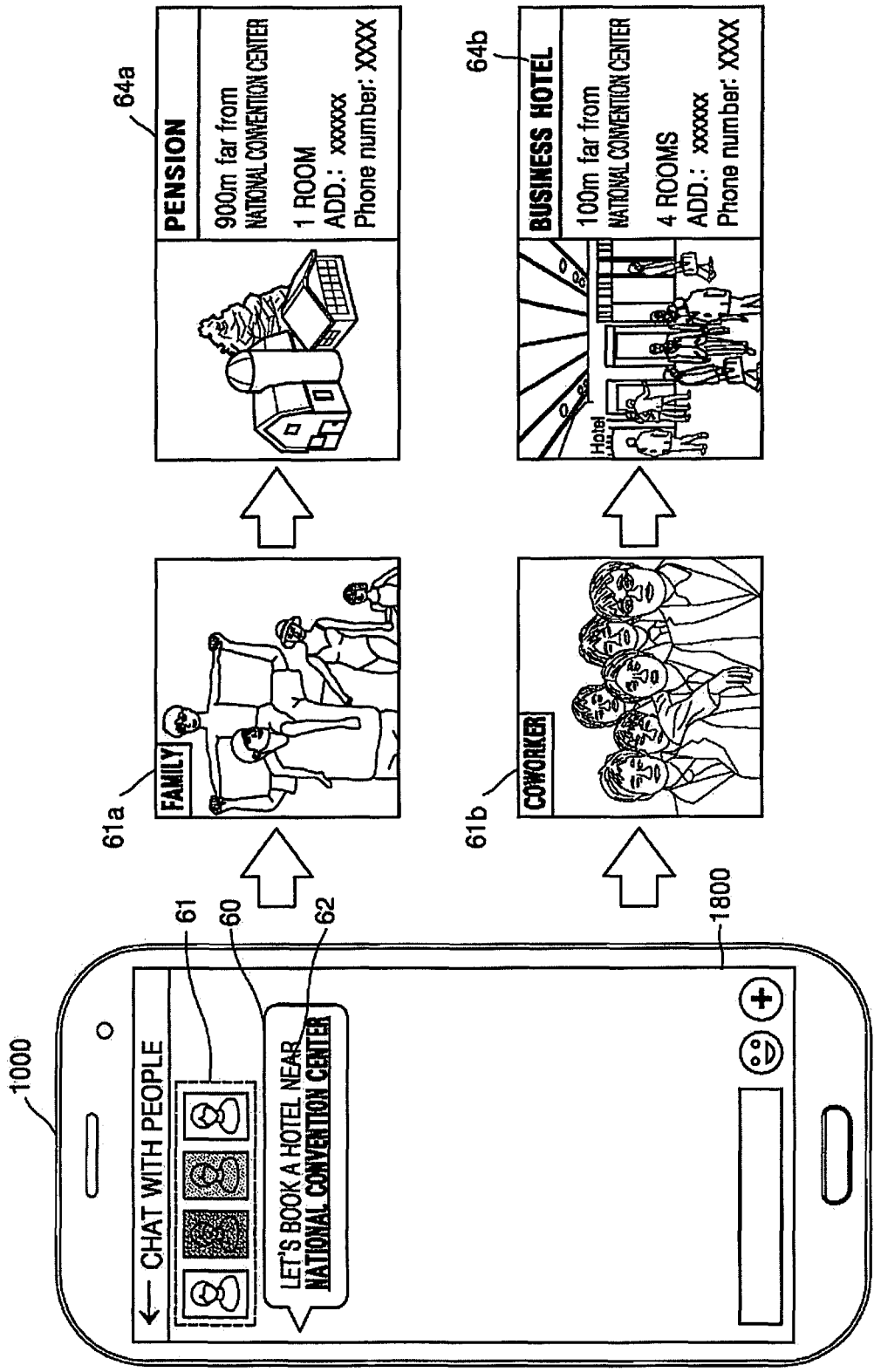
FIG. 6 illustrates example content determined based on a social relationship between users.

FIG. 6 illustrates example content determined based on a social relationship between users.

Referring to FIG. 6, content corresponding to a POI and adaptive to a user may be determined based on social relationship of a user, such as social relationship between the user and conversation partners 61, the number of people including the user and the conversation partners 61, pertinent information about the user and the conversation partners 61.

As illustrated in FIG. 6, "National Convention Center" may be determined as a POI in conversation text 60 between the user and the conversation partners 61. A hotel near "National Convention Center" may be determined as a POI.

In response to a user input with regard to the POI 62, such as "National Convention Center", content corresponding to the POI 62 and adaptive to the user may be acquired and displayed by the electronic device 1000. Here, the content may be acquired based on a social relationship between the user and conversation partners 61, the number of people including the user and the conversation partners 61, pertinent information about the user and the conversation partners 61.

Referring to FIG. 6, when a social relationship between the user and the conversation partners 61 is family relationship, pension reservation service content 614a may be acquired and displayed by the electronic device 1000, and the number of rooms and beds may be determined based on the number of people including the user and the conversation partners 61. When a social relationship between the user and the conversation partners 61 is a coworker relationship, business hotel reservation service content 64b may be acquired and displayed, and the number of rooms may be determined based on the number of people including the user and the conversation partners 61.

In an exemplary embodiment, when social relationship between the user and the conversation partners 61 is classmate relationship or stranger relationship, a hotel service content for a reservation of an ordinary room may be acquired and displayed by the electronic device 1000.

Social relationship between a user and conversation partners, pertinent information about the user and the conversation partners may be extracted from contact information about the user, or determined by analyzing conversation text therebetween, or determined based on characteristics of a chat set by the user.

In an exemplary embodiment, a reservation history of a user, a distance between a POI and accommodation, rating of the accommodation may be used to determine accommodation reservation service content corresponding to the POI and adaptive to the user.

Figure 7:
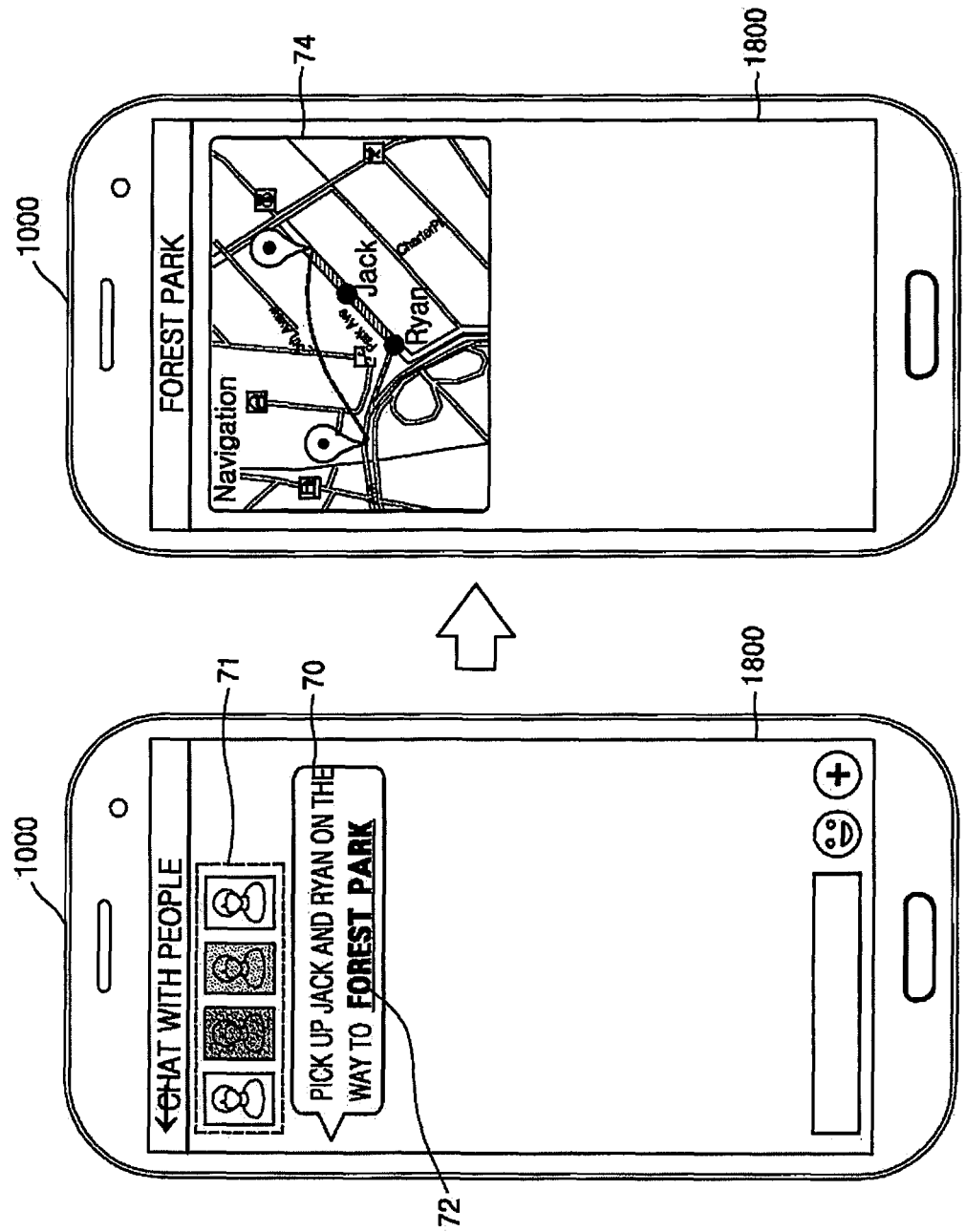
FIG. 7 illustrates example content determined based on information regarding a user and a conversation partner.

FIG. 7 illustrates example content determined based on information regarding a user and a conversation partner.

In an exemplary embodiment, information regarding a location of a user may be collected by a sensor of the electronic device 1000, a location history of the electronic device 1000, or data received by the user.

Referring to FIG. 7, "Forest Park" may be determined as a POI 72 in conversation text 70 between a user and conversation partners 71. Furthermore, it may be determined that the user will drive a car to "Forest Park" based on context of the conversation text 70. Based on determination of driving a car, a navigation service content 74 may be acquired and displayed to provide to the user information about car navigation, traffic condition, parking lot, etc. Content to be provided to a user may be determined based on a behavior history and interest of the user as well as context of conversation text.

Referring to FIG. 7, it may be determined that the user will drop by houses of Jack and Ryan then go to "Forest Park" based on context of the conversation text 70 between the user and the conversation partners 71. Locations of houses of Jack and Ryan may be determined based on profile information of users by the electronic device 1000. The navigation service content 74 may be acquired and displayed by the electronic device to provide navigation of the most suitable route for a car from a current location or house of the user to "Forest Park" to drop by houses of Jack and Ryan.

A direct route from the current location of the user to "Forest park" is illustrated by a dot line, and a route to drop by houses of Jack and Ryan is illustrated by slanted lines in FIG. 7.

Details of content may be limited based on semantic analysis on text. For example, when it is determined, based on semantic analysis on text, that a price or arrival time is limited under a certain level, content suitable for the limited price or arrival time may be acquired and displayed by the electronic device 1000. That is, an accommodation service content providing a reservation of a cheaper accommodation than the limited price, and a transportation service content providing a reservation of means of transportation that arrives at a POI earlier than the limited arrival time may be acquired and displayed.

Figure 8:
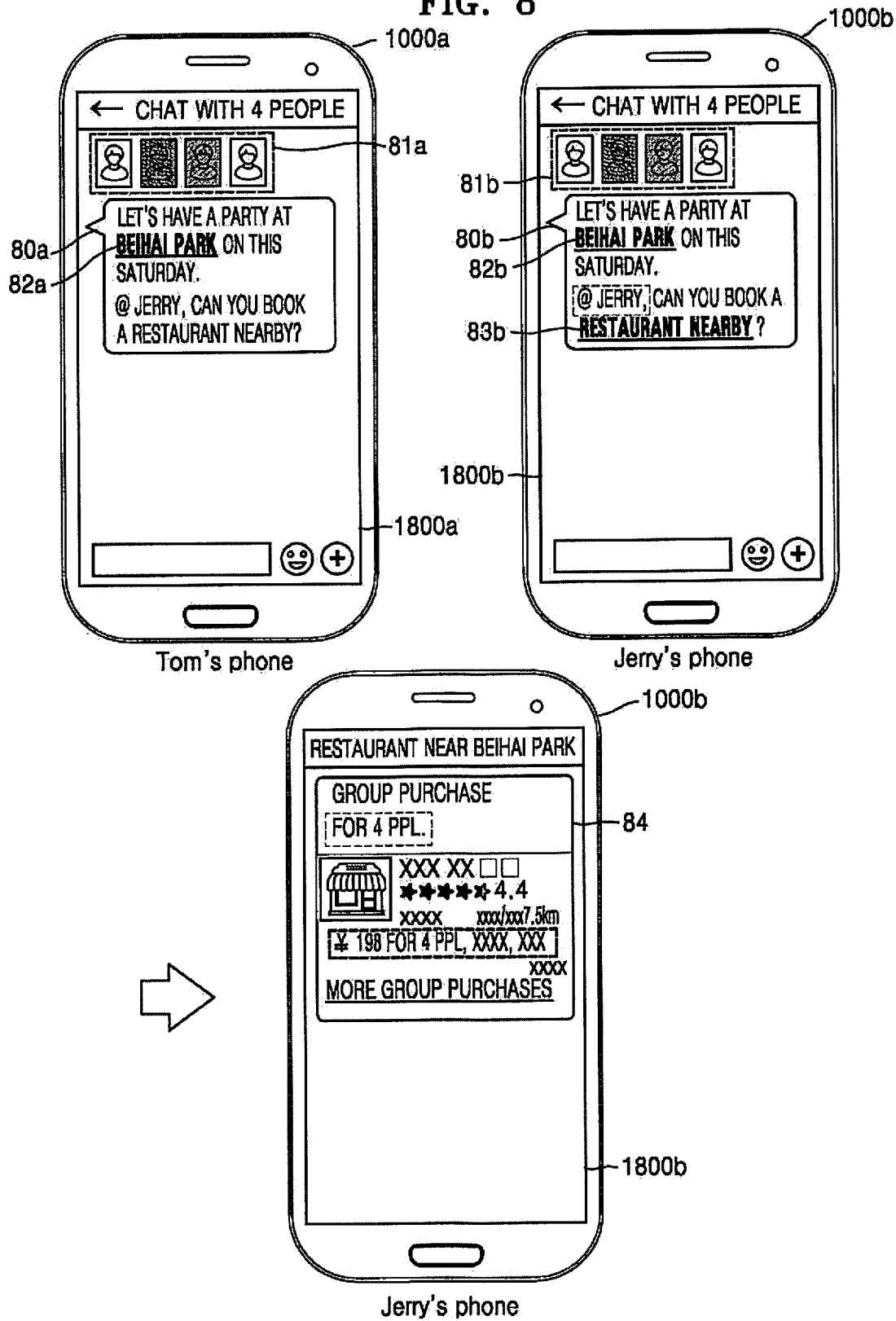
FIG. 8 illustrates example content that is adaptive to a user.

FIG. 8 illustrates example content that is adaptive to a user.

In an exemplary embodiment, a subject interacting with content may be determined based on context of conversation text between a user and conversation partners. For example, Jerry may be determined as a subject interacting with content, and content 84 corresponding to a POI may be acquired and displayed by a Jerry's phone as illustrated in FIG. 8.

Referring to FIG. 8, "Beihai Park" may be determined as a POI 82*a* or 82*b* in conversation text 80*a* or 80*b*. In an exemplary embodiment, a POI may be determined in text based on a mission of a user and the mission may be determined based on context of the text. For example, referring to FIG. 8, when "@" is detected in text, a subject mentioned after "@" may be determined as a subject interacting with content, and a POI mentioned after "@" may be further determined as a POI which is highlighted only on the subject's device. For example, "restaurant near" may be determined as a POI 83*b* and highlighted in a Jerry's device 1000*b*, but not highlighted in other's device such as Tom's phone 1000*a*.

"restaurant near" may be correlated with restaurants near "Beihai Park" based on context of conversation text.

Content corresponding to a POI and adaptive to a user may be acquired and displayed based on the number of people including a user and conversation partners. For example, referring to FIG. 8, when it is determined that the number of people including a user and conversation partners is 4, a restaurant group purchasing service content 84 for 4 people may be acquired and displayed by Jerry's device 1000*b* in response to a user input with regard to the POI 83*b*.

Figure 9:
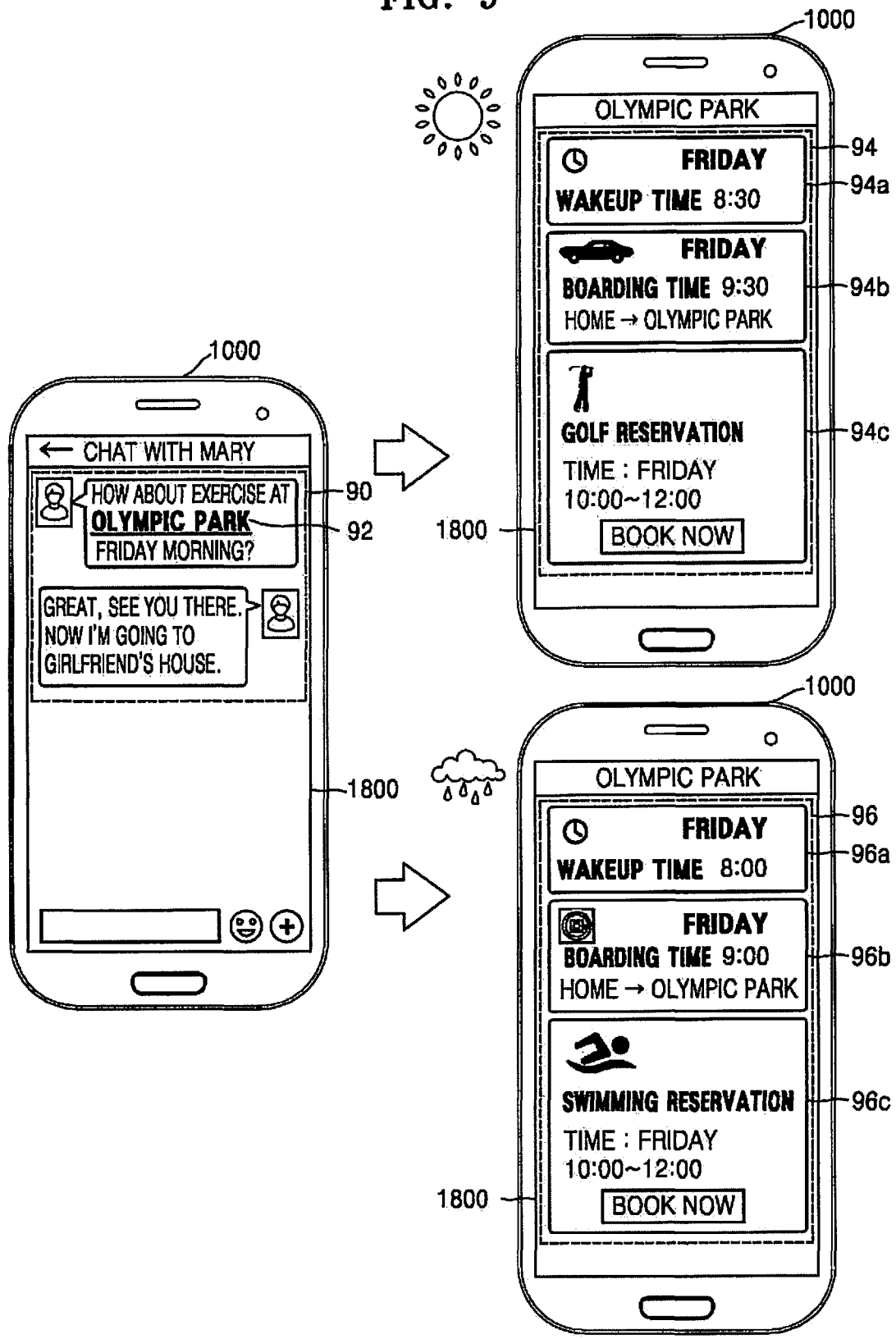
FIG. 9 illustrates other example content determined based on weather information.

FIG. 9 illustrates other example content determined based on weather information.

Information collected by the electronic device 1000 may include information about a location, battery, power consumption, standby time, communication status, installed applications, application in foreground, and application in background of an electronic device 1000, and external information received from a server, such as weather information and traffic information, but is not limited thereto.

In an exemplary embodiment, content may be acquired and displayed based on weather information and traffic information. Referring to FIG. 9, when it is determined that it will rain on a scheduled day based on weather information and context of conversation text, service content for providing a reservation of an indoor activity may be acquired and displayed. For example, swimming reservation service content 96*c* may be acquired and displayed.

According to the weather information and traffic information, it may be determined that a ground traffic is jammed on a rainy day. So a subway service content 96*b* may be acquired and displayed by the electronic device 1000 based on the weather information and traffic information.

When it takes 50 minutes from a user's house to Olympic park, a boarding time of subway may be adjusted to 09:00, and a wake-up time may be adjusted to 08:00 accordingly. Information about a departure time and route map of a subway may be provided to a user a day before the scheduled day, and information about a transfer and arrival alarm may be provided to the user.

The factors related to the weather condition on a predetermined date will be analyzed below. When it is determined, based on the weather information, that it is sunny in the morning on the scheduled day but rains in the afternoon of the scheduled day at "Olympic park", indoor activity service content may be acquired and displayed based on a reservation time. For example, the golf reservation service content 94*c* may be acquired and displayed by the electronic device 1000 based on a plurality of factors.

Figure 10:
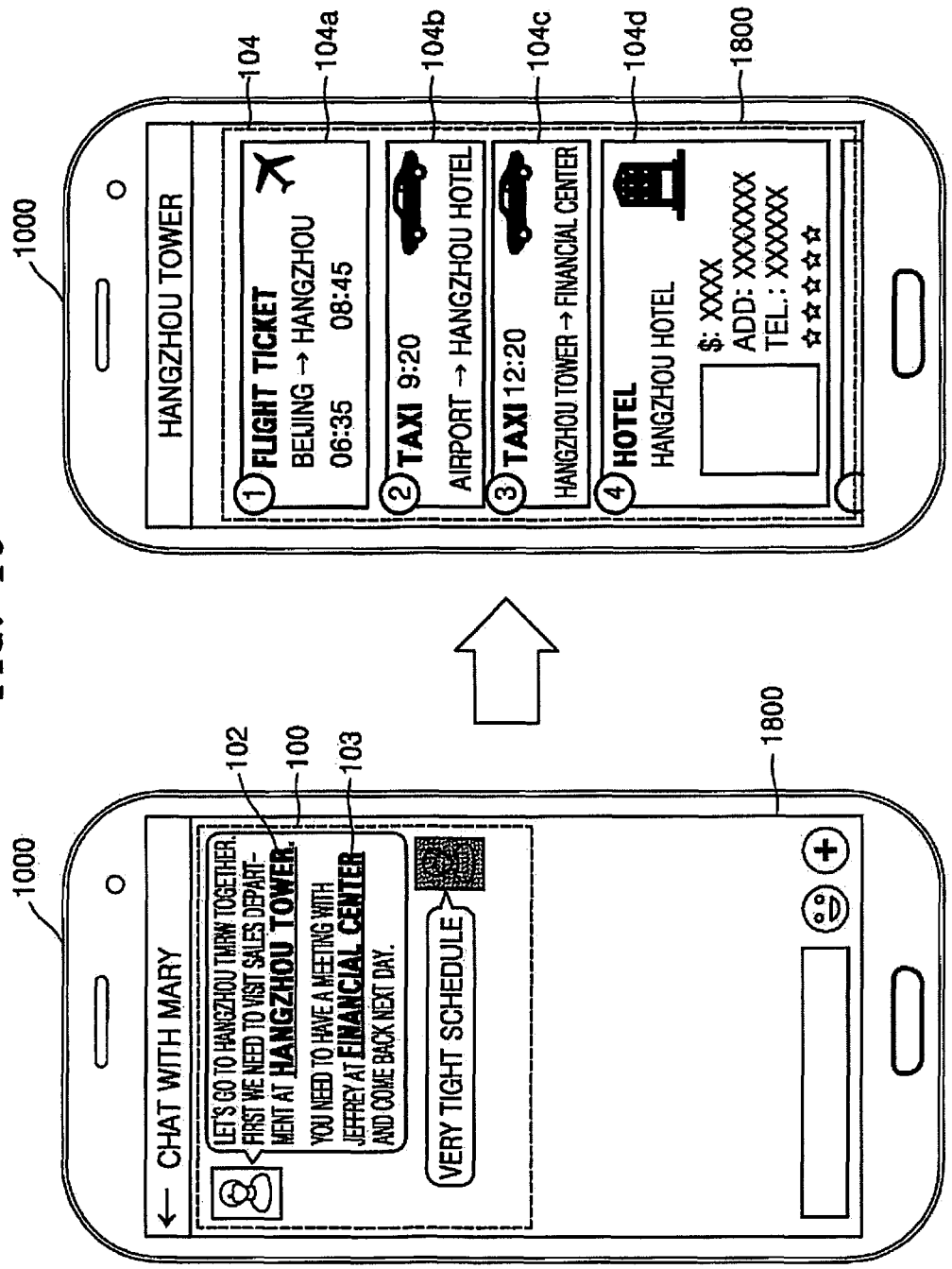
FIG. 10 illustrates example content corresponding to a plurality of POIs.

FIG. 10 illustrates example content corresponding to a plurality of POIs.

In an exemplary embodiment, a plurality of POIs may be determined and displayed in text. The plurality of POIs may be correlated with each other, or independent. Some of the POIs may be correlated with each other.

Relationship between the plurality of POIs may be determined based on context of text including the POIs, information regarding a user, external information, information collected by the electronic device 1000, etc.

A user input may be received with regard to one POI of the plurality of POIs, or some POIs of the plurality of POIs, or all of the POIs.

Referring to FIG. 10, "Hangzhou Tower" and "Financial Center" may be determined as POIs 102 and 103 in conversation text 100 displayed on a chatting interface of the electronic device 1000, and two POIs 102 and 103 may be correlated with each other. In response to a user input with regard to a POI 102, content corresponding to the POIs 102 and 103 and adaptive to a user may be acquired and displayed.

In an exemplary embodiment, a plurality of service contents corresponding to a plurality of POIs may be acquired and displayed together. Service content corresponding to a certain POI may be completed or expired. The service contents displayed may be adjusted based on completion or expiration of service content. Completed or expired service content may not be displayed after completion or expiration. An indicator of completion or expiration may be displayed at or adjacent to the completed or expired service content. A color of the completed or expired service content may be changed.

For example, referring to FIG. 10, when a user stays at "Hangzhou Tower" on 12:50 of a scheduled day, that is a date corresponding to "tomorrow" in conversation text 100, a flight service content 104*a* for transportation from Beijing Airport to Hangzhou Airport and taxi service content 104*b* for transportation from Hangzhou Airport to Hangzhou Tower are completed, and a taxi service content 104*c* for transportation from Hangzhou Tower to Financial Center may be expired. A hotel reservation service content 104*d* may be confirmed.

In response to a user input with regard to expired service content, menus for adjusting details of the expired service content may be displayed. For example, menus for cancellation of a taxi, changing of a boarding time, reservation of a taxi, etc. may be displayed.

Figure 11:
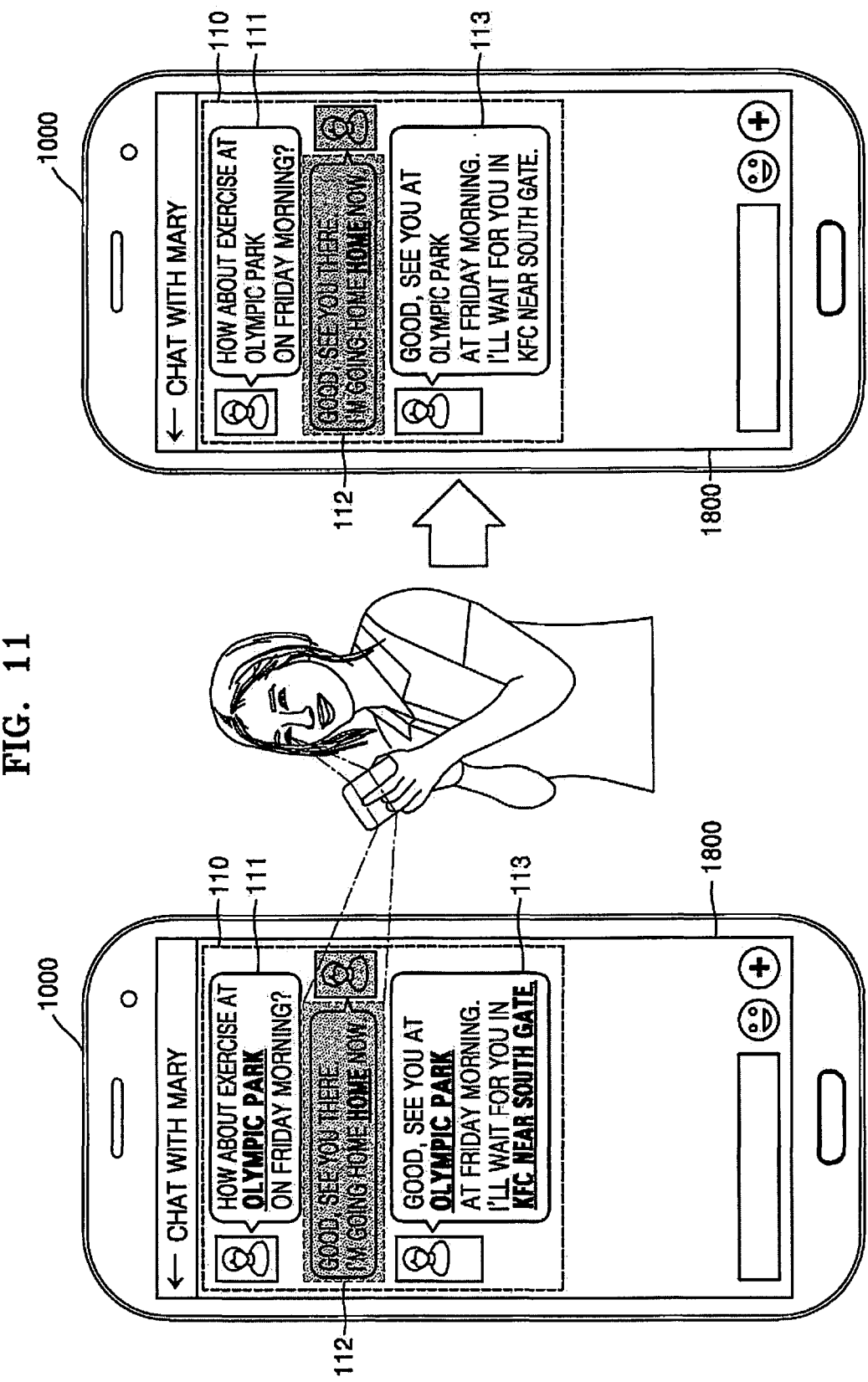
FIG. 11 illustrates example content that is adaptive to a user's visual focus.

FIG. 11 illustrates example content that is adaptive to a user's visual focus.

A POI may be highlighted in text. As the number of highlighted POIs increases, readability of the text may be degraded.

According to an exemplary embodiment, the electronic device 1000 may display a POI based on a visual focus of a user.

Referring to FIG. 11, the electronic device 1000 may display all POIs determined in conversation text 110. However, when all POIs are highlighted in the text 110, readability of the text 110 may be degraded.

The electronic device 1000 may detect a visual focus of a user on a display of the electronic device 1000 and display or highlight a POT in a region 112 corresponding to the visual focus. The visual focus of the user may be detected by tracing the user's pupil with a camera. The electronic device 1000 may determine a posture of the user by a gyroscope to detect the visual focus more accurately. The visual focus may be detected by a peripheral device.

According to an exemplary embodiment, a POI may be displayed or highlighted in text based on a visual focus of a user, and readability of the text may improve.

All POIs may be displayed or highlighted in text based on a user's selection.

Figure 12:
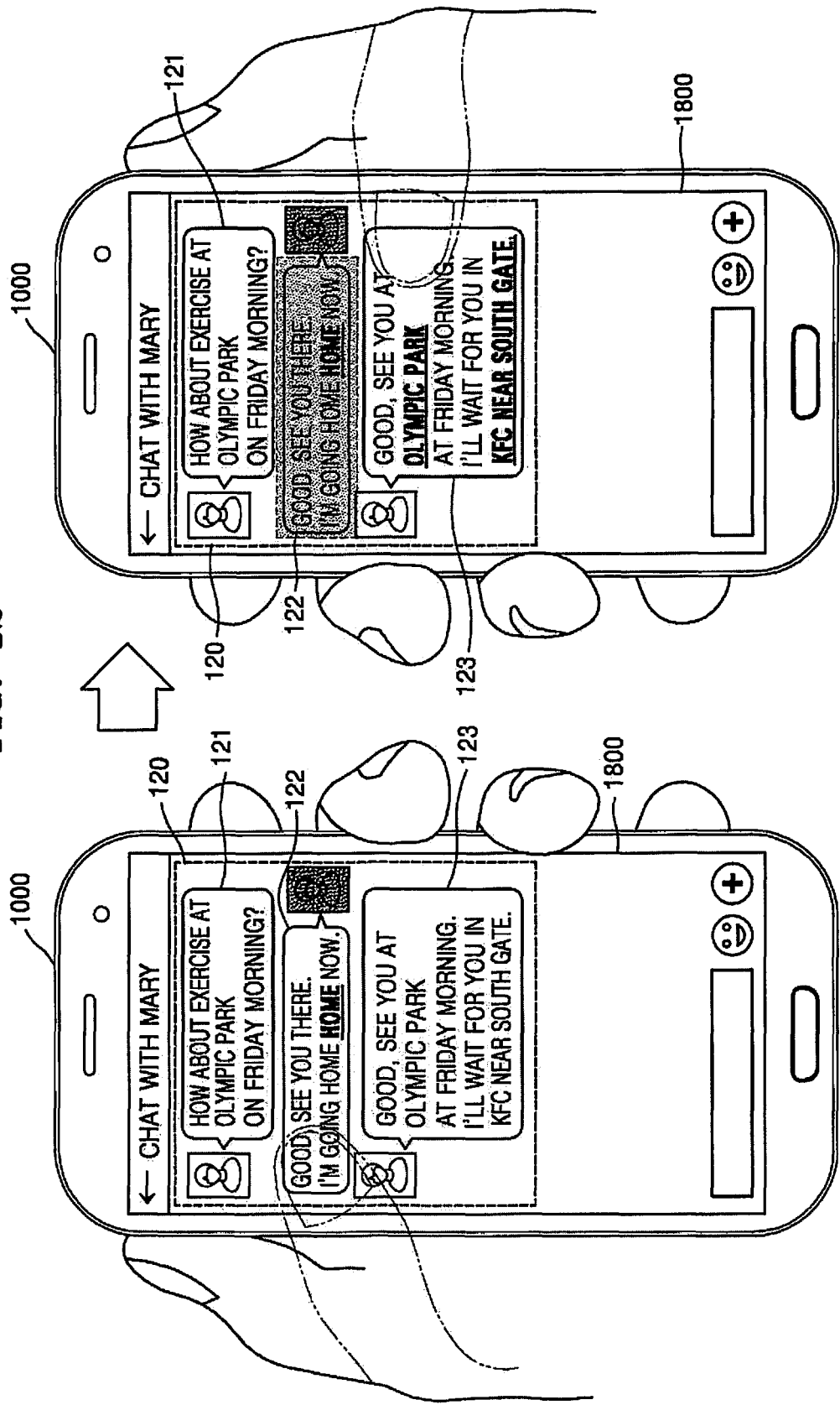
FIG. 12 illustrates example content that is adaptive to a user's touch focus.

FIG. 12 illustrates example content that is adaptive to a user's touch focus.

A POI may be highlighted in text. As the number of highlighted POIs increases, readability of the text may be degraded.

According to an exemplary embodiment, the electronic device 1000 may display a POI based on a grip of a user.

Referring to FIG. 12, when it is detected that a user is holding the electronic device 1000 with his left hand, a POI in an area 122 where a finger is hovering over or touched on may be displayed or highlighted in conversation text 120. Referring to FIG. 12, "house" is highlighted in the conversation text 120.

Referring to FIG. 12, when it is detected that a user is holding the electronic device 1000 with his right hand, a POI in an area 123 where a finger is hovering over or touched on may be displayed or highlighted in text 120.

The electronic device 1000 may determine, based on a grip of a user, an area in which a POI is highlighted. For example, when it is determined that a user is holding the electronic device 1000 with his right hand, a POI in an upper right area which a finger is easily reachable may be highlighted in the text 120.

A POI determined in text may be displayed based on a manual operation or interaction of a user. For example, when a certain area is selected by a user, a POI in the selected area may be highlighted. When a stylus or finger hovers over an area on the electronic device 1000, a POI in the area where a stylus or finger hovers may be highlighted or displayed.

Options of a filtering a selection may be provided to a user. For example, a POI determined in text may be categorized, and the POI may be filtered by a category selected by a user.

In an exemplary embodiment, the electronic device 1000 may determine a conversation partner in the text 120, and display of a POI may be optimized based on the conversation partner. For example, when a user A communicate with user B and C simultaneously by a chatting application, the number of POIs involved in communication with a user B may be greater than the number of POIs involved in communication with a user C based on a selection or preference of the user A, or social relationship with user B and C.

In an exemplary embodiment, when text includes a plurality of the same POIs therein, only one POI may be highlighted in the text. Here, the plurality of the same POIs may correspond to a different words that are presented in the text.

Figure 13:
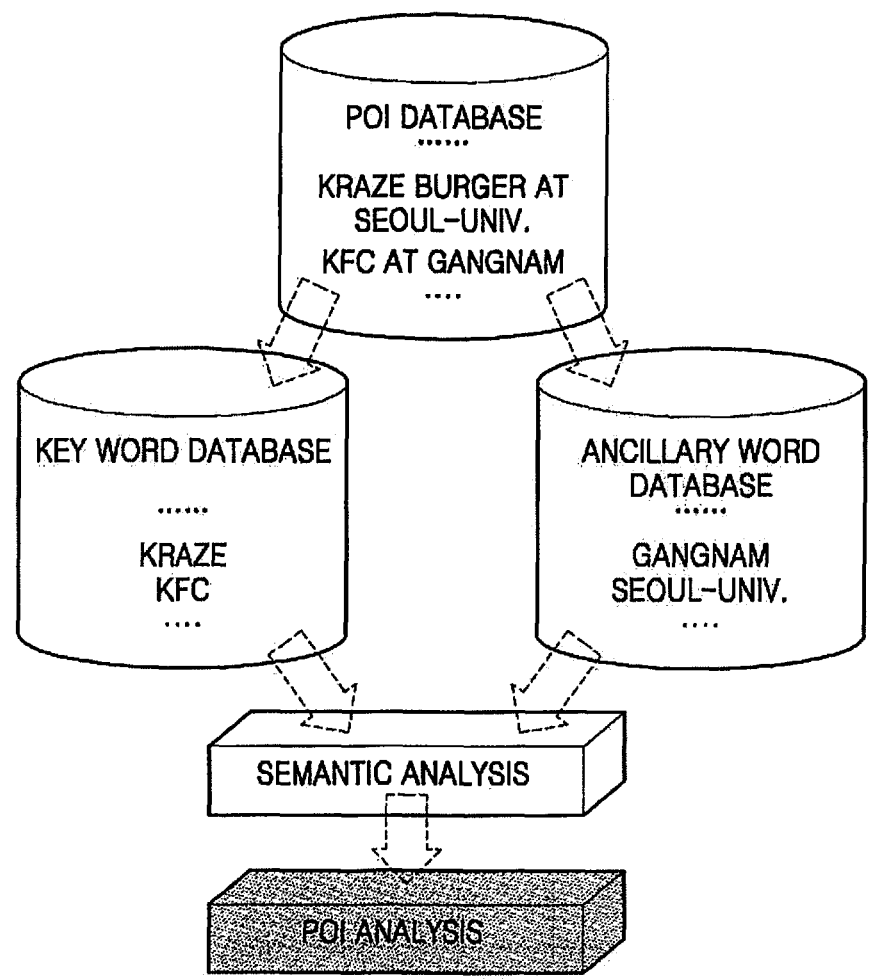
FIG. 13 illustrates an example method of determining a POI in text.

FIG. 13 illustrates an example method of determining a POI in text.

Semantic analysis may be performed on text to determine a POI in the text. DB matching may be performed on the text with respect to a standard POI database to search for a POI matched with the text.

Referring to FIG. 13, branch names, such as "Kraze Burger at Seoul Univ.", "KFC at Gangnam", may be stored in the standard POI database. The standard POI DB may further store information regarding an address, contact, latitude and longitude of a location, and a link of services provided in the location. The standard POI DB may be installed in an electronic device or accessed by online. A name of a location may be collected from the web. The latitude and longitude information of a location may be used to quickly search the location in a map, and also used to calculate a distance between the location and an electronic device of a user. As described above, a POI may be referred to as a certain point, store, branch store, location, product, video, or music that interests people.

Text may be segmented by semantic analysis. As a result of segmentation, a part of speech such as a verb, noun, adjective, adverb, etc. of the segmented text may be determined to determine a subject, predicate, and object in the text.

In order to increase the accuracy and precision of semantic analysis, a following segmentation method may be used in an exemplary embodiment. Semantic analysis may have a defect according to a result of text segmentation. It may be difficult to use semantic analysis in an application without text segmentation A name of a POI stored in the standard POI DB may be segmented, which may be useful for determining an appropriate POI in text.

For example, "Kraze Burger at Seoul Univ." may be segmented into "Kraze", "Burger", and "Seoul Univ." How to perform segmentation is well-known by those of ordinary skill in the art and will not be repeated here.

A key word and an ancillary word may be distinguished from text as a result of the text segmentation.

A key word may include a word essential to specify a corresponding POI. For example, "Kraze" or "KFC" may be the word essential to specify its corresponding POI.

An ancillary word may include a word describing its corresponding POI, such as a region and category of the POI, but is not limited thereto. For example, a word describing a region of a POI may include a region name (such as "Gangnam" or "Seoul"), street name (such as "Garosu Street"), landmark name (such as "Olympic Park", "Seoul Univ."), but is not limited thereto. For example, a word describing a category of POI may be "hamburger", "restaurant", "hospital", etc., but is not limited thereto.

An ancillary word may include auxiliary information to specify its corresponding POI in detail. Auxiliary information may include, for example, a store number of a store named "Haolinju Convenience Store No. 117", headquarter sign of a store named "the Head Office of the People's Bank of China", branch sign of a store named "XX campus of High School Affiliated to Renmin University of China", but is not limited thereto.

How to distinguish a key word and ancillary word from text is already known by those skilled in the art and is not explained redundantly here. A distinguished key word may be stored in a key word DB, and a distinguished ancillary word may be stored in an ancillary word DB. The key word DB and ancillary word DB may be combined together, and further combined with the standard POI DB.

By using POI analysis, customization in determining a POI may be performed.

The accuracy and adequacy of the POI analysis may improve by feedback from users.

For example, the accuracy and adequacy of the POI analysis may improve by determining whether users take a further action on a POI determined in text. If when it is determined that a user hasn't taken a further action on a POI A determined in text, weighting on the POI A in the same condition may be reduced. If when it is determined more than once that a user hasn't taken a further action on a POI A determined in text, weighting on the POI A in the same condition may be reduced, and not determined as a POI any more, which may cause another POI to be determined in the text. In this way, a result of customization in determining a POI may improve.

The accuracy and adequacy of the POI analysis may improve by determining whether users take a further action on a POI determined in text.

How to train a POI analysis module is already known by those skilled in the art and is not explained redundantly here.

The key word DB and ancillary word DB may be used for semantic analysis on text.

Figure 14:
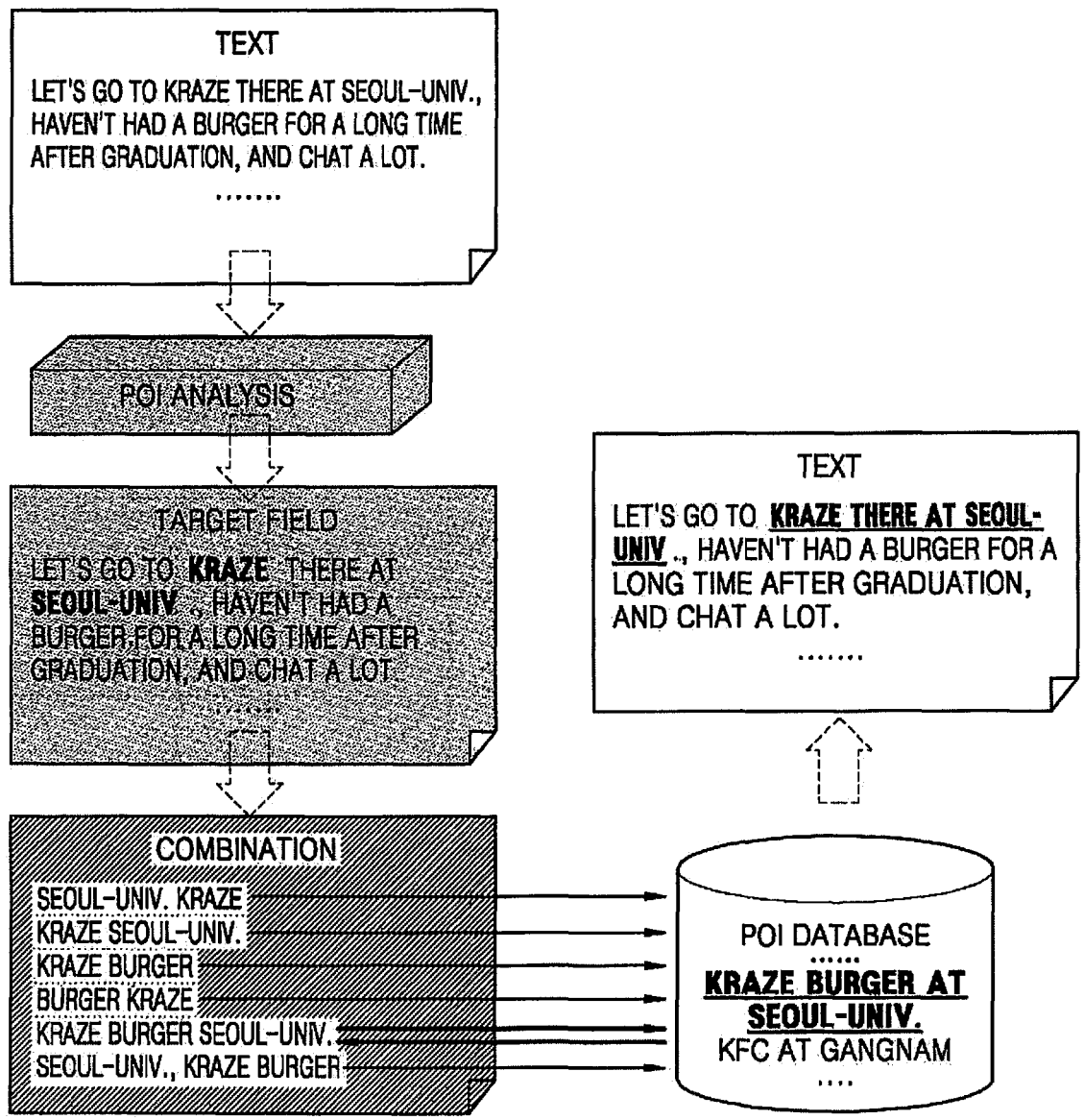
FIG. 14 illustrates an example method of determining a POI in unclear text.

A method of performing POI analysis on text is explained by referring to FIG. 14.

FIG. 14 illustrates an example method of determining a POI in unclear text.

Text may be segmented. Referring to FIG. 14, a text of "Let's go to Kraze there at Seoul-Univ., haven't had a burger for a long time after graduation, and chat a lot." may be segmented.

A key word and ancillary word may be determined based on the segmented text. For example, DB matching may be performed on each segmented text with respect to the key word DB to search for a key word matched with the segmented text. The ancillary word DB may be searched for an ancillary word.

A target field set may be generated based on the determined key word and ancillary word. One target field set is generated per one key word, that is, one target field set includes one key word. A word, among ancillary words, having a semantic relation distance to the key word less than a set value, is classified into the target field set, but is not limited thereto.

Furthermore, a key word and ancillary word may be combined together in each target field set. At least one combined phrase including a key word may be acquired based on variation of combinations of a key word and ancillary word in a target field set. For example, when a target field set includes a key word "Kraze" and ancillary words "Seoul-Univ." and "burger", combined phrases may be ""Seoul-Univ. Kraze", "Kraze Seoul-Univ", "Kraze burger", "burger Kraze", "Kraze burger Seoul-Univ.", "Seoul-Univ., Kraze burger", etc.

Variation of combinations of words in a target field set may be searched in the standard POI DB. If there is a POI corresponding to a certain combination of the words in the standard POI DB, words included in the combination may be determined as a POI in text, and highlighted.

When a key word of a combination coincides with a key word of a POI in the standard POI DB, and an ancillary word of the combination coincides with or is similar to an ancillary word of the POI, it may be determined that the combination corresponds to the POI. An order of a key word and ancillary word in a target field set may be negligible. That is, an key word and ancillary word may be combined in various orders.

Here, conjunctions such as "at", "in", "of", etc. may be negligible.

Based on the above method, a certain combination of words may be determined as a POI in text.

The POI analysis may be performed based on information regarding a user.

When text is "my boyfriend is going to take me to his hometown in this weekend", "boyfriend", "boyfriend's hometown", etc. may be identified from the text based on the information regarding a user by the POI analysis.

When the identified text corresponds to a POI, the identified text may be marked or highlighted.

Specifically, when the identified text corresponds to a certain address based on the information regarding a user, the identified text may correspond to a POI. For example, when address of boyfriend's hometown is stored in contact or acquired based on the information regarding a user, the address may be determined as a POI. When the address is determined as a POI, the identified text that corresponds to the address may be marked or highlighted.

Thus, by using the POI analysis, unspecific text such as "boyfriend's hometown" also may be determined as a POI. When text is "Let's go to the Szechuan restaurant that you just recommend", "the Szechuan restaurant" in the text may be identified by analyzing context of the text, and then it may be determined as a POI having an address such as "Yuxiangrenjia, CapitaLand Mall, Taiyanggong Middle Road, Chaoyang District, Beijing City, China".

Information regarding a user's current location and a POI may be input into a location-based service model.

In order to acquire a POI adaptive to a user, an analysis may be performed based on the location-based service model.

For example, based on identified text such as "the Szechuan restaurant", its corresponding POI such as "Yuxiangrenjia, CapitaLand Mall, Taiyanggong Middle Road, Chaoyang District, Beijing City, China" is determined, and then a user's current location may be further used to provide content corresponding to the POI and adaptive to the user.

For example, traffic service content may be provided to the user. Map service content may be provided to the user. Through service content, a public transport or driving route service from the user's current location to a target address may be provided to the user.

Thus, a personalized service may be provided to the user. Here, the target address may be determined according to a POI.

Figure 15:
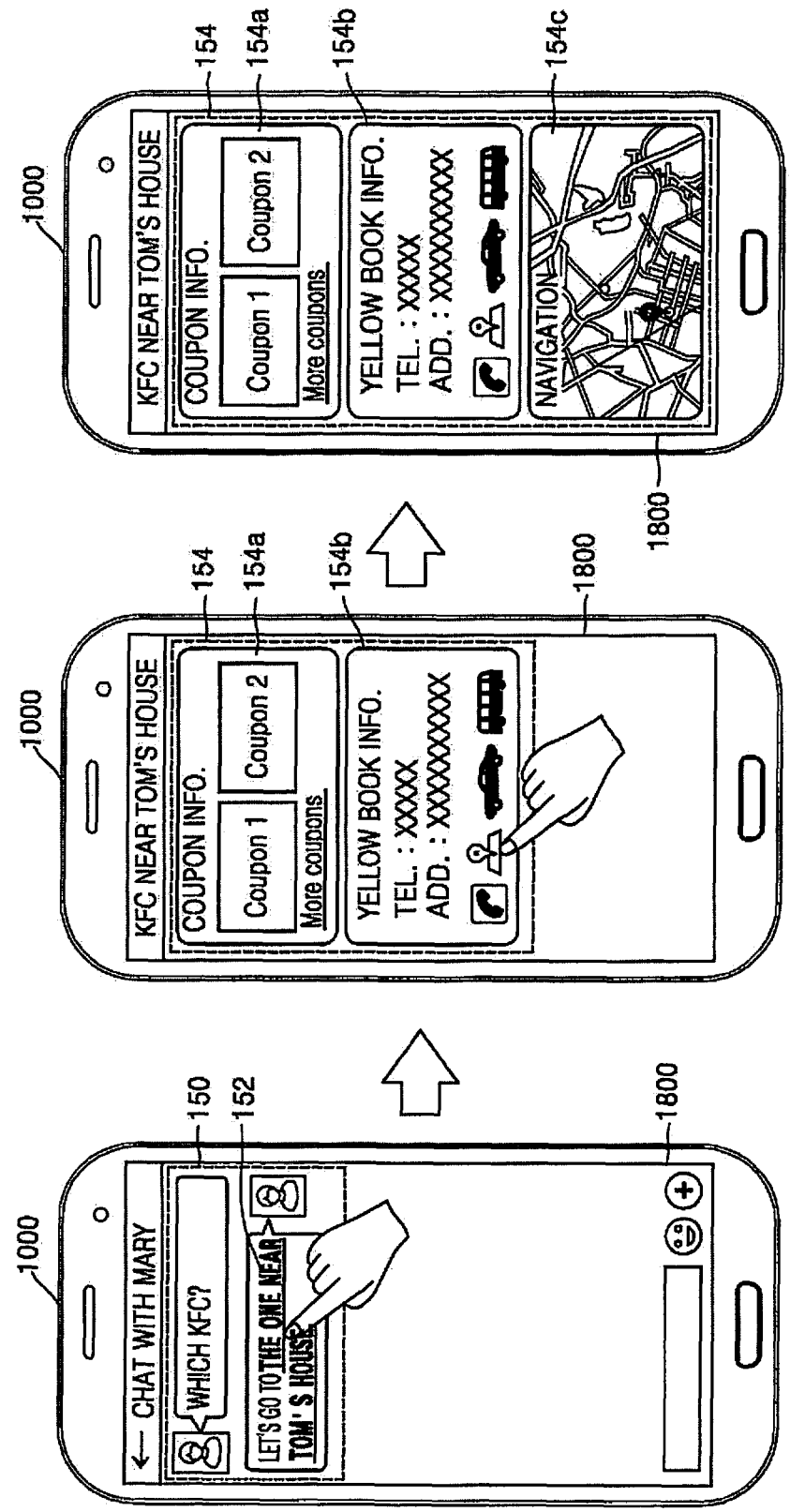
FIG. 15 illustrates example content corresponding to a POI determined in unclear text.

FIG. 15 illustrates example content corresponding to a POI determined in unclear text.

As illustrated in FIG. 15, a plurality of POI pieces 152, such as the one near, and Tom's house may be highlighted in text. The plurality of POI pieces 152 may be related with each other, and a series of service contents 154 corresponding to the plurality of POI pieces 152 and adaptive to a user may be acquired and displayed.

The plurality of POI pieces 152 may be determined context of text including the plurality of POI pieces 152, information regarding a user, external information, etc.

A POI in text may be unclear, for example, semantically unclear or ambiguous. Therefore, an accurate POI corresponding to unclear POI may be determined. Specifically, the accurate POI corresponding to the unclear POI may be determined according to the unclear POI, context of text including the unclear POI, information regarding a user, external information, etc. Here, the unclear POI may include a reference POI. Accordingly, the accurate POI may correspond to the reference POI.

Description of a POI made by a user may be unclear or ambiguous. As a result, a POI may not be determined in text due to its unclearness or ambiguity. In an exemplary embodiment, the electronic device 1000 may perform POI identification to determine an accurate POI based on text including an unclear POI, context of the text, information regarding a user, and/or history information.

Referring to FIG. 15, an accurate POI may be determined based on text 150 including unclear POI 152. From an unclear POI of "the one near Tom's house" in the text 150, an accurate POI of "KFC near Tom's house" may be determined according to context of the text 150. For example, referring to information regarding a user, "Tom's house" may be determined as "Building 3, Xibahedongli Community, Chaoyang District, Beijing City, China", and the accurate POI may be determined as "KFC near Building 3, Xibahedongli Community, Chaoyang District, Beijing City, China".

When the electronic device 1000 determines POI as "KFC near Building 3, Xibahedongli Community, Chaoyang District, Beijing City, China", the electronic device 1000 may search for KFC near "Building 3, Xibahedongli Community, Chaoyang District, Beijing City, China" from the POI database. Through system inquiry, it may be determined that there is KFC within two kilometers, with a distance of 500 m away from "Building 3, Xibahedongli Community, Chaoyang District, Beijing City, China", which may be "KFC in CapitaLand Mall in Taiyanggong Middle Road".

As described above, the electronic device 1000 may determine an accurate POI of "KFC in CapitaLand Mall in Taiyanggong Middle Road" based on an unclear POI of "the one near Tom's house."

Referring to FIG. 15 group purchase service content 154*a* and yellow book service content 154*b* corresponding to a POI may be displayed in response to a user input. According to user's preference and purchase history in KFC, a service content 154*a* adaptive to the user may be displayed. Meanwhile, a menu of "More Group Purchases" may be provided to the user. Further information about another group purchases may be obtained by selecting the menu of "More Group Purchases". The yellow book service content 154*b* may include a phone number, address, a map, and other information of a POI. In response to a user input to the service contents 154*a* and 154*b*, various operations such as phone call, path finding may be performed.

For example, a navigation service content 154*c* may be displayed in response to a user input with respect to a map icon in the yellow page service content 154*b*.

It is to be noted that, the form of service contents provided to a user in the electronic device 1000 is not limited to text, image, map and the like, and voice, video or other forms may be used to provide service contents. For example, the navigation service content 154*c* may be provided to a user by audio or video.

Figure 16:
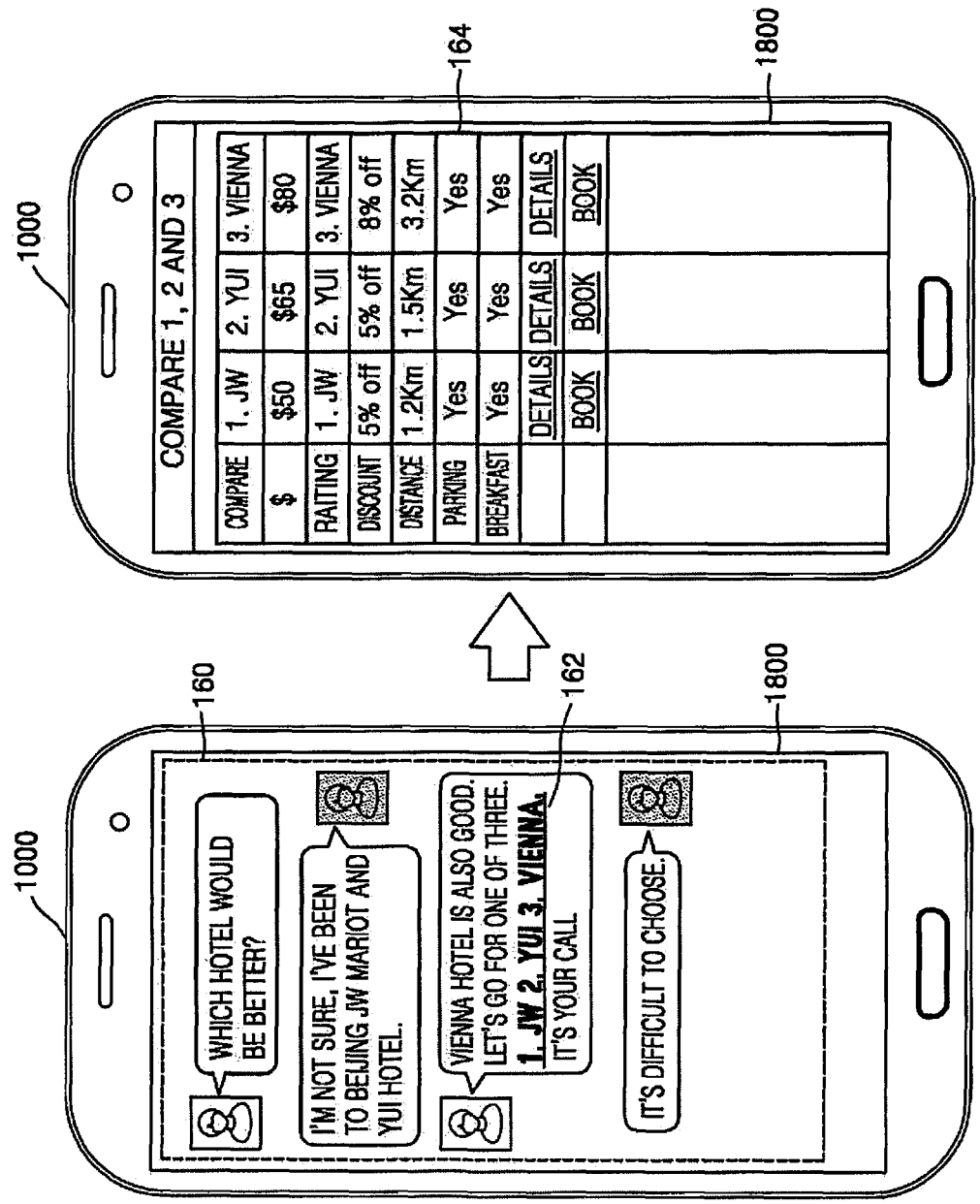
FIG. 16 and FIG. 17 illustrate example content that is adaptive to context of text.
Figure 17:
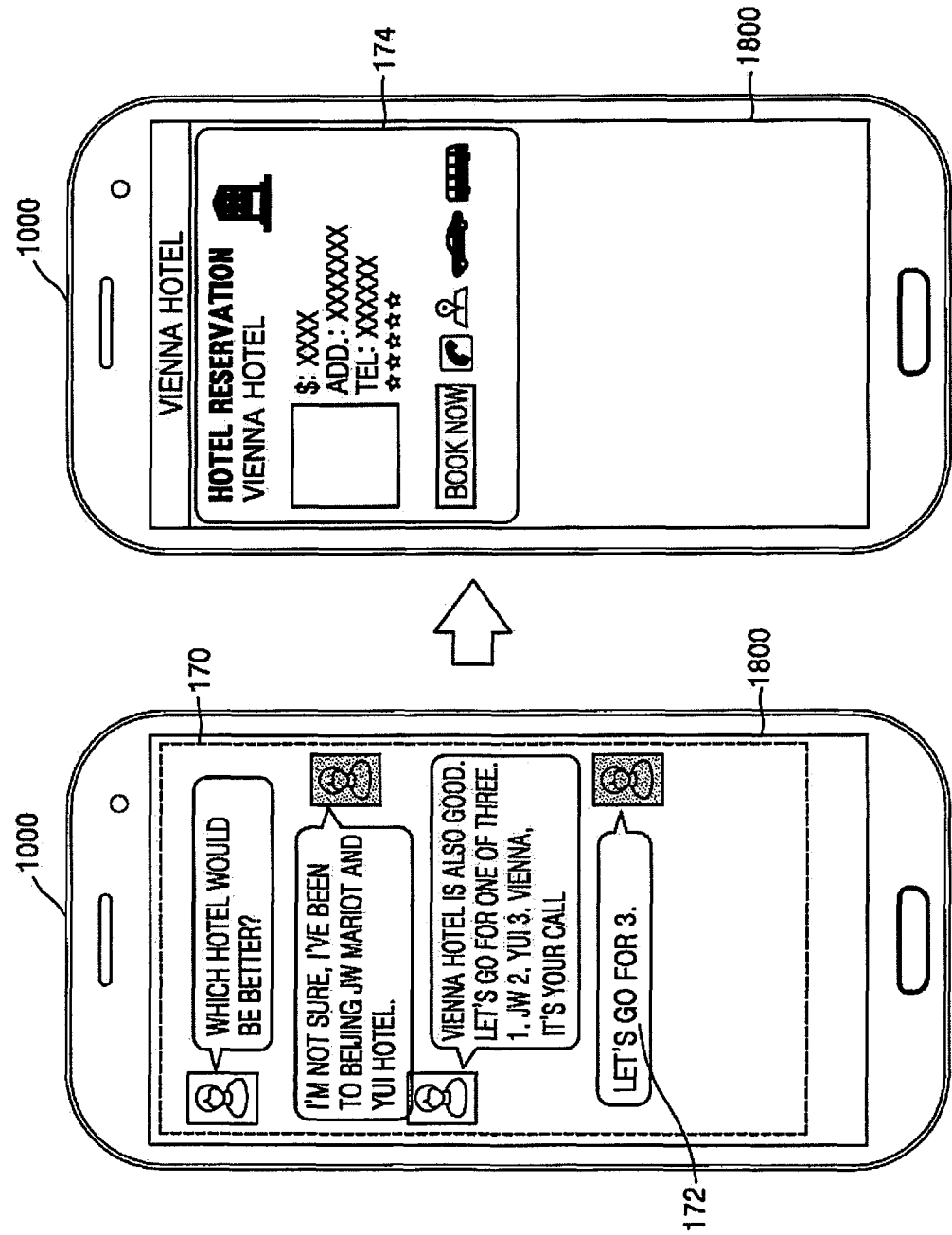

FIG. 16 and FIG. 17 illustrate example content that is adaptive to context of text.

The electronic device 1000 may identify a POI having a reference relation based on context of text.

Referring to FIG. 16, the electronic device 1000 may determine, based on semantic analysis, that text relates to hotel selection, and determine, based on POI analysis, that 1. corresponds to JW Marriott Hotel, 2. corresponds to Yui Hotel, and 3. corresponds to Vienna Hotel. When a number or alphabet near a POI is next to a symbol such as a period point, comma, and bracket, words near the POI may be linked to the POI.

For example, when the electronic device 1000 detects an expression such as "3." next to a POI of "Vienna Hotel" in text, "3." may be linked to the POI. Further, "3." also may be highlighted in the text.

In an exemplary embodiment, it may be determined whether a user is hesitating or determined by performing semantic analysis on text, and a service content may be acquired based on user's attitude.

For example, when the electronic device 1000 determines based on text 160, that users are hesitating among POIs 162, the electronic device 1000 may acquire and display a service content 164 of comparing the POIs 162 in response to a user input with respect to the POIs 162.

When the electronic device 1000 determines based on text 170, that a user has decided to go for "3.", the electronic device 1000 may acquire and display a service content 174 corresponding to a POI linked to "3." POIs linked to "1." and "2." may be unmarked, and a POI linked to "3." may be highlighted in the text 170. The service content 174 may be one of service contents described before.

Figure 18:
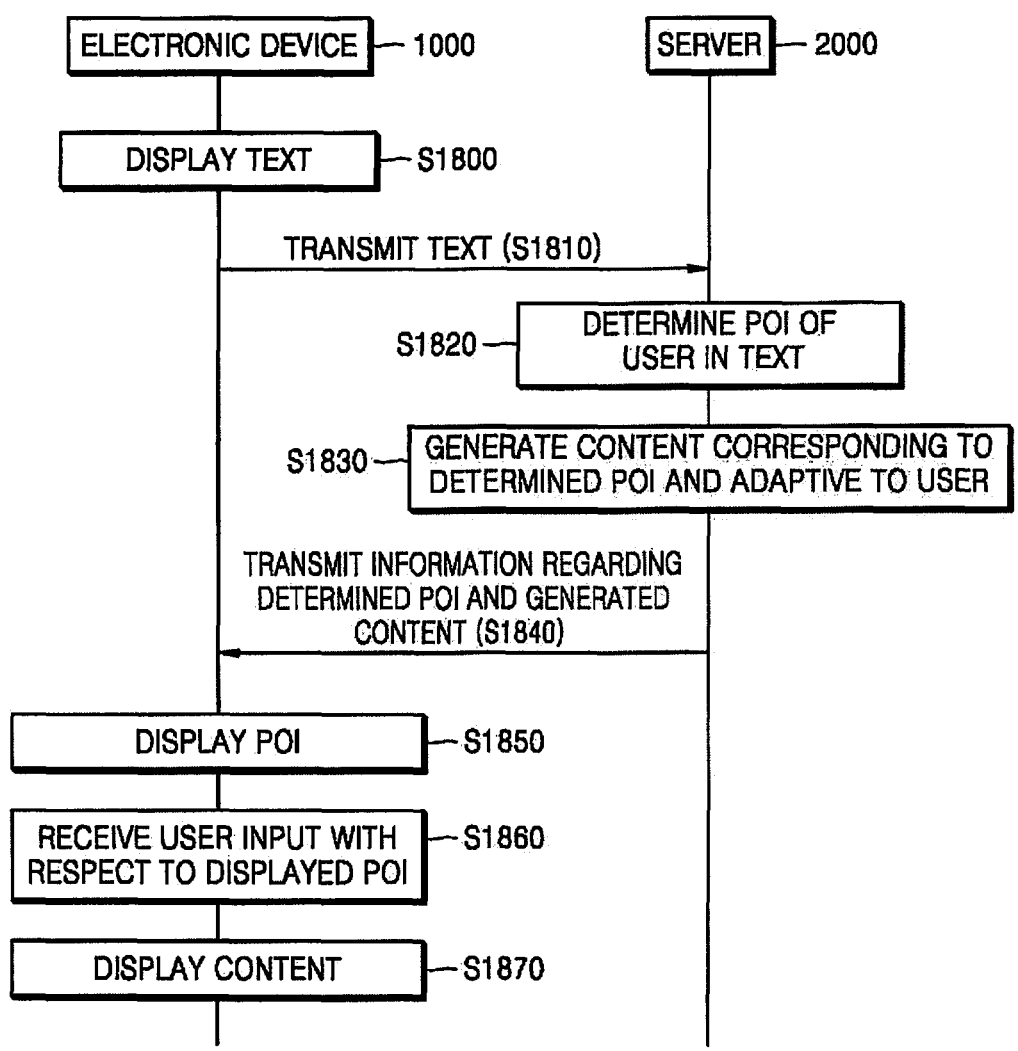
FIG. 18 illustrates a flowchart of a method of providing content to an electronic device.

FIG. 18 illustrates a flowchart of a method of providing content to an electronic device.

Referring to FIG. 18, content corresponding to a POI and adaptive to a user in text may be generated by a server, and then provided to the electronic device 1000 of the user.

In operation S1800, the electronic device 1000 may display text. The text may be received at the electronic device 1000 by a user.

In operation 1810, the device 1000 may transmit the text to a server 2000. The electronic device 1000 may include a communication interface to transmit text to the server 2000.

In operation S1820, the server 2000 may determine a POI in the received text. An explanation of determining a POI in text is described above.

In operation S1830, the server may generate content corresponding to the POI and adaptive to a user. Content corresponding to the POI and adaptive to a user may be generated based on various standards described above.

In operation S1840, the server 2000 may transmit information regarding the determined POI and the generated content.

In operation S1850, the electronic device 1000 may display the POI in the text based on the transmitted information. The electronic device 1000 may highlight the POI in the text.

In operation S1860, the electronic device 1000 may receive a user input with regard to the POI to display the content.

Transmission of the content by the server 2000 may be performed in response to the user input with regard to the POI.

According to an exemplary embodiment, resource of the electronic device 1000 may be saved and big data of the server 2000 may be employed to identify a POI in text and generate content corresponding to the identified POI.

Figure 19:
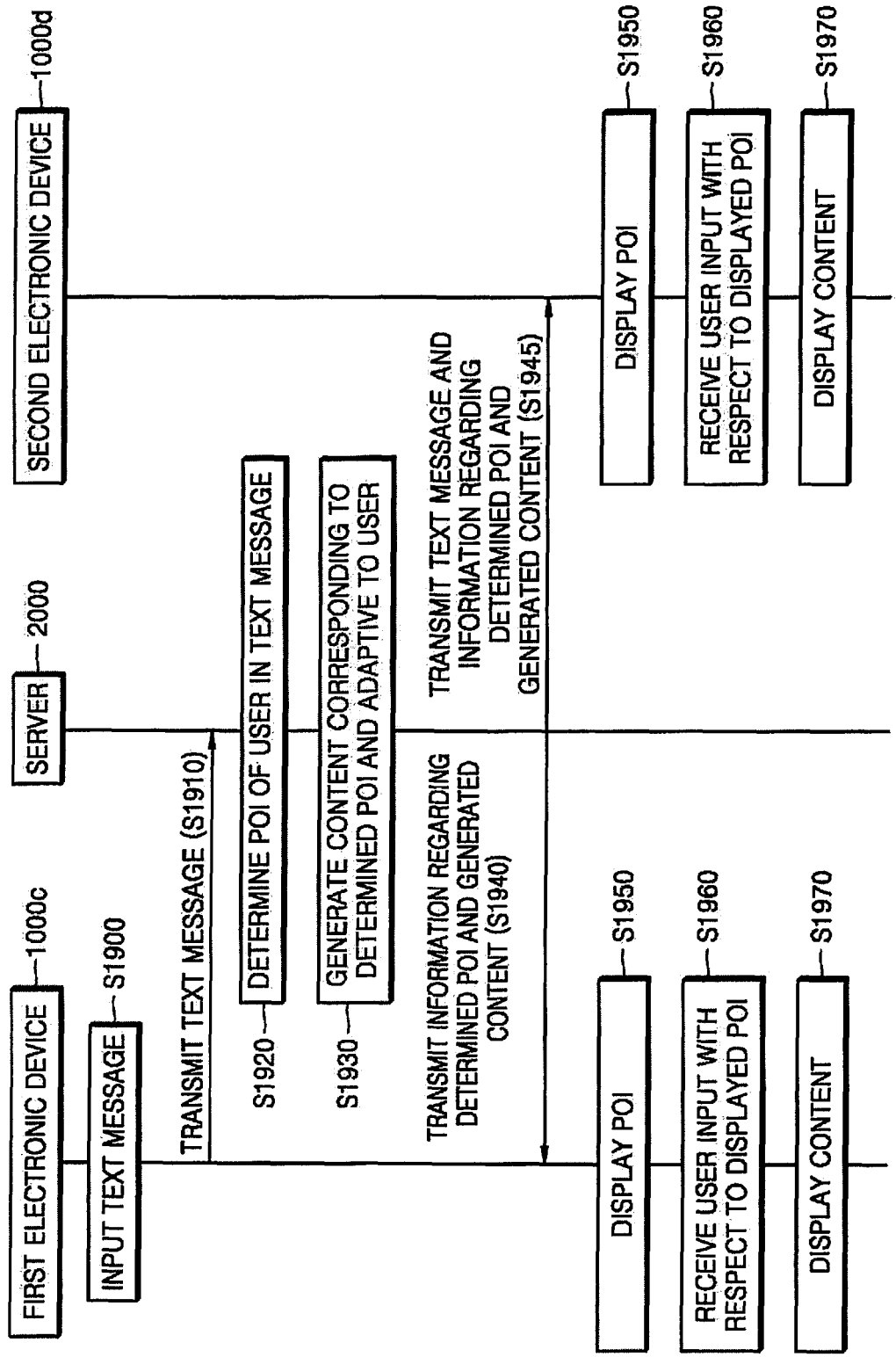
FIG. 19 illustrates a flowchart of a method of providing content to a plurality of electronic devices.

FIG. 19 illustrates a flowchart of a method of providing content to a plurality of electronic devices.

Referring to FIG. 19, while a plurality of electronic device 1000*c* and 1000*d* communicate with each other, transmission of content corresponding to a POI and adaptive to a user may be performed by a server 2000.

In operation S1900, a first electronic device 1000*c* may receive a user input with regard to a text message. In operation S1910, the first electronic device 1000*c* may transmit the text message to the server 2000.

In operation S1920, the server 2000 may determine a POI in the received text message. In operation S1930, the server 2000 may generate content corresponding to the determined POI and adaptive to a user. The user may include a user of the first electronic device 1000*c* or the second electronic device 1000*d*, or both of them.

In operations S1940 and S1945, the server 2000 may transmit the generated content to the first electronic device 1000*c* and the second electronic device 1000*d*.

In operation S1950, the devices 1000*c* and 1000*d* may display the POI. In operation S1960, the devices 1000*c* and 1000*d* may receive a user input with regard to the POI. In operation S1970, the devices 1000*c* and 1000*d* may display the content in response to the user input.

Transmission of the generated content in operations S1940 and S1945 may be performed in response to receiving the user input with regard to the POI.

Figure 20:
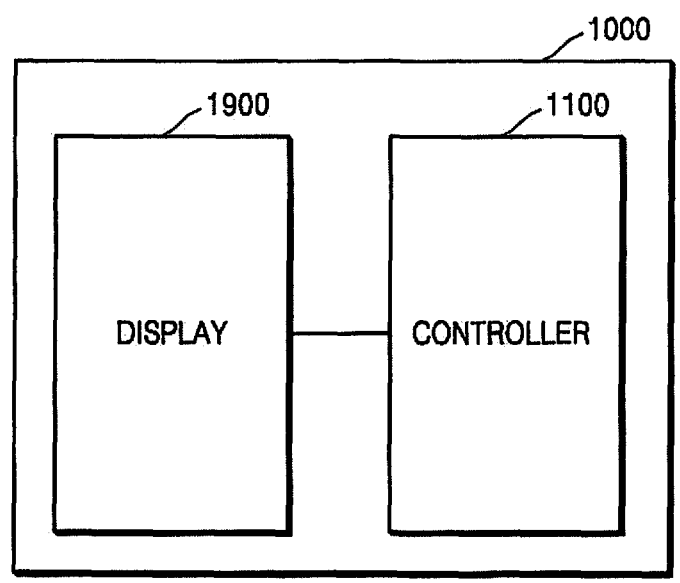
FIG. 20 and FIG. 21 illustrate an example electronic device.
Figure 21:
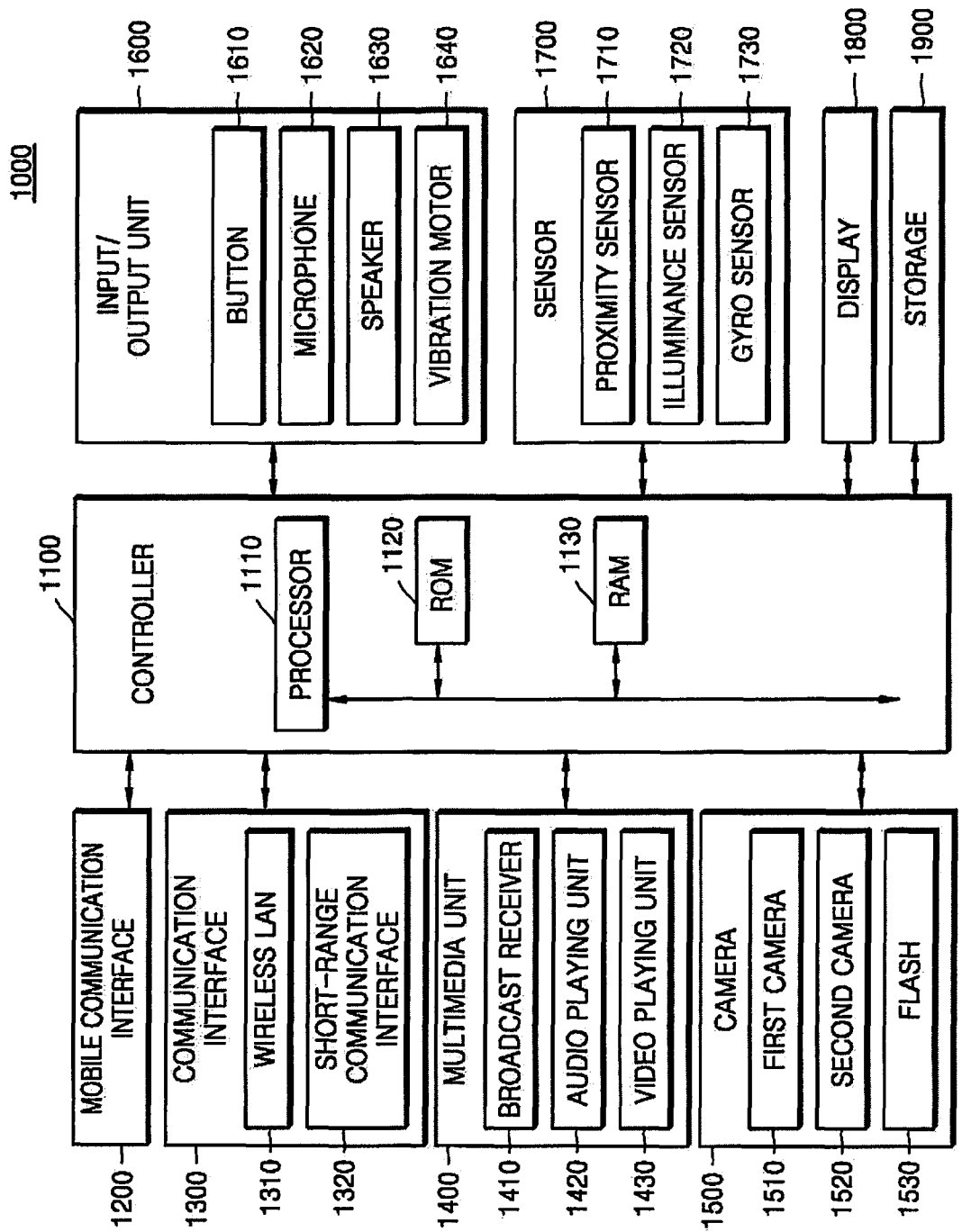

FIG. 20 and FIG. 21 illustrate an example electronic device.

The electronic device 1000 may display text and a POI determined in text, and acquire and display content corresponding to the POI and adaptive to a user.

Referring to FIG. 20, an electronic device 1000 may include a controller 1100 and a display 1800.

The controller 1100 may generally control the overall operation of the electronic device 1000.

The display 1900 may display information obtained through processing by the controller 1900.

Text and a POI of a user determined in the text may be displayed on the display 1800.

The text may include conversation text between users, such as, a short message, multi-media message, chatting message, e-mail message, etc.

A POI may be determined in conversation text by performing DB matching or semantic analysis on the conversation text by the controller 1100.

The determined POI may be displayed in highlight on the display 1800. The POI 12 may be displayed in various ways.

In an exemplary embodiment, a POI may be determined based on audio data, picture data, or video data. For example, when the controller 1100 receive audio data, such as a voice saying, "A meeting in Shanghai ICC is scheduled for next Thursday", the controller 1100 may perform speech recognition on the received audio data to convert it to text. The controller 1100 may determine "Shanghai ICC" as a POI in the text converted from the received picture data. When the controller 1100 receives picture data including text of "A meeting in Shanghai ICC is scheduled for next Thursday", the controller 1100 may perform character recognition on the received picture data to convert it to text. The controller 1100 may determine "Shanghai ICC" as a POI in the text converted from the received picture data.

The controller 1100 may acquire content corresponding to the displayed POI and adaptive to the user in response to a user input with regard to the displayed POI.

In an exemplary embodiment, the controller 1100 may generate the content corresponding to the POI and adaptive to the user, or receive the content from an external device or a server, or extract the content from a plurality of contents.

Here, types of the content may be distinguished based on its details. Details of service content may include a subject, expected starting time, expected ending time, expected time of period, or specification of a service, but is not limited thereto.

In an exemplary embodiment, service content corresponding to the POI may include a transportation service content for providing information about transportation from a current location to the POI, and accommodation service content for providing information about accommodation near the POI. The transportation service content and accommodation service content may respectively include reservation service content for making a reservation with respect to transportation and accommodation service content.

In an exemplary embodiment, the transportation service content may include inter-regional transportation service content for providing information about transportation from one state, province, or city to another one, and regional transportation service content for providing information about transportation within the same region, such as, the same state, province, or city. The inter-regional transportation service content may include flight service content, train service content, or ship service content, but is not limited thereto. The regional transportation service content may include a taxi service content, subway service content, intra-city bus service content, but is not limited thereto.

According to an exemplary embodiment, content may have a time sequence. For example, each of the contents may have a time sequence according to an itinerary from a current location of a user to the POI. That is, the flight service content, taxi service content, and hotel service content may be arranged in a time sequence based on an itinerary including flight transportation from the Beijing Airport to the Shanghai Airport, taxi transportation from the Shanghai Airport to the hotel near the POI, and staying at the hotel near the POI. A priority of contents may differ based on the time sequence, and details of each of the contents may be arranged in the time sequence. Referring to FIG. 1, when a departure time and arrival time of a flight provided by the flight service content 14a are respectively determined as 06:35 and 08:45, an expected departure time of a taxi provided by the taxi second 14b may be determined as 09:20, and a check-in time of a hotel may be determined based on an expected arrival time of the taxi. As described above, details of each contents 14a, 14b, and 14c may be arranged in the time sequence based on the itinerary.

In an exemplary embodiment, content may correspond to a POI of a user and be acquired based on information regarding the user.

The information regarding a user may include information about a location, itinerary, conversation text, context thereof, profile, behavior history, social relationship, contact, emotion, fatigability, and health condition of the user, but is not limited thereto.

The display 1800 may display the acquired content.

The acquired content may be displayed by a GUI where the POI has been displayed, by another GUI, or by another application.

In an exemplary embodiment, when a plurality of contents are acquired, the plurality of contents may be arranged and displayed in a time sequence on the display 1800 of the electronic device 1000. For example, as illustrated FIG. 1, the flight service content, taxi service content, and hotel service content may be arranged and displayed in a time sequence based on an itinerary including flight transportation from the Beijing Airport to the Shanghai Airport, taxi transportation from the Shanghai Airport to the hotel near the POI, and staying at the hotel near the POI.

According to an exemplary embodiment, processes for searching the POI and making a reservation regarding the POI may be simplified by contents adaptive to a user's itinerary.

In an exemplary embodiment, service content may be adaptive to a schedule of a user. A schedule of a user may be acquired from a schedule management application of the electronic device, or a cloud schedule management application.

In an exemplary embodiment, a schedule of a user may be acquired based on text such as conversation text between users, such as, a short message, multi-media message, chatting message, e-mail message, etc.

In an exemplary embodiment, a schedule of a user may be acquired by performing character recognition on an image including a user's schedule.

According to an exemplary embodiment, when a schedule of a user acquired from a certain source is different than one from another source, the controller 1100 may generate a notification of a conflict between schedules, and control the display 1800 to display the notification. For example, the electronic device 1000 may have the notification appear as a pop-up or display the notification via a notification bar. According to an exemplary embodiment, each schedule acquired from different sources may have a different priority. For example, a schedule from conversation text between users may have a priority over one from a schedule management application. Here, the electronic device 1000 may acquire service content for attending a meeting in at 15:00 "Shanghai ICC" based on the conversation text. The electronic device 1000 may display the notification of the conflict via a pop-up or a notification bar in response to a user input with regard to the POI "Shanghai ICC", an entry asking the user whether to be provided with service content corresponding to the POI, or asking the user whether to be provided with service content related to the user's schedule may be displayed or played in audio. The entry may be in form of keys.

For example, when it is determined that a user will fly from Beijing to Shanghai to arrive at "Shanghai ICC", the controller 1100 may acquire and display a hotel service content for a reservation of hotels near "Shanghai ICC." The hotel service content may include a menu, such as "Book Now", which is adaptive to a user's check-in time.

The hotel service content may include information regarding a hotel recommended by the controller 1100 or a server. For example, when it is determined that a user has stayed at a certain hotel near "Shanghai ICC", the certain hotel may be recommended. Another hotel with the same rating or stars with the certain hotel may be recommended. A hotel closest to "Shanghai ICC", or rated the highest may be recommended.

The service content related to the user's schedule may be embodied by using a schedule management application or an application programming interface provided by a schedule management website.

However, all the components shown in FIG. 20 are not essential components of the electronic device 1000. The electronic device 1000 may be embodied by more or less components than shown in FIG. 20. For example, as illustrated FIG. 3, the electronic device 1000 may further include a mobile communication interface 1200, communication interface 1300, a multimedia unit 1400, camera 1500, input/output unit 1600, sensor 1700, storage 1900.

Details of each component of the electronic device 1000 is described below.

The controller 1100 may perform various functions of the electronic device 1000 by controlling overall operations of the electronic device 1000. For example, the controller 1100 may execute programs stored in the storage 1900 to control the communication interface 1300, multimedia unit 1400, camera 1500, input/output unit 1600, sensor 1700, storage 1900, and the display 1800.

The controller 1100 may include at least one processor 1110. The controller 1100 may include a read-only memory (ROM) 1120 that stores a control program for controlling the electronic device 1000. Also, the controller 1100 may store a signal or data input from other devices, such as a server 2000. The controller 1100 may include a random access memory (RAM) 1130 that is used as a storage for various operations performed by the electronic device 1000.

The processor 1110 may include a graphic processing unit (GPU) for a graphic processing. The processor 1110 may be embodied as a system-on chip (SoC) including a core and the GPU. The processor 1100 may include a single core processor, a dual core processor, a triple core processor, a quad core processor, or a multiple core processor. The processor 1110, ROM 1120, and RAM 1130 may be connected to each other through a bus.

The electronic device 1000 may communicate with other devices, such as a server 2000, through the mobile communication interface 1200 and the communication interface 1300.

The communication interface 1300 may include a wireless LAN 1310, and a short range communication interface 1320.

The electronic device 1000 may be wirelessly connected to an access point (AP) through the wireless LAN 1310 at a place where the AP is installed. The wireless LAN 1310 may include, for example, Wi-Fi. The wireless LAN 1310 may support IEEE802.11x of IEEE. The short range communication interface 1320 may communicate with other devices without the AP.

The short-range communicator 1320 may include a BLUETOOTH communicator, a BLUETOOTH Low Energy (BLE) communicator, a Near Field Communicator, a WLAN communicator, a ZigBee communicator, an Infrared Data Association communicator, a Wi-Fi Direct communicator, an Ultra-WideBand communicator, an Ant+ communicator, a Z-wave communicator, etc.

The mobile communication interface 1200 may communicate a radio signal with at least one from among a base station, an external terminal, and a server 2000 via a mobile communication networks. The mobile communication interface 1200 may communicate the radio signal, which is used for a voice call, a video call, a short message service (SMS), a multimedia message service (MMS), with other devices having a phone number. Here, the radio signal may be a voice call signal, a video call signal, or data in any one of various formats according to transmission and reception of a text/multimedia message.

The multimedia unit 1400 may include a broadcast receiver 1410, an audio playing unit 1420, or a video playing unit 1430.

The broadcast receiver 1410 may receive, through an antenna, a broadcasting signal (for example, a TV broadcasting signal, a radio broadcasting signal, or a data broadcasting signal) and additional broadcasting information (for example, electronic program guide (EPS) or electronic service guide (ESG)) transmitted from a broadcasting station according to control by the controller 1100. Also, the controller 1100 may play the received broadcasting signal and additional broadcasting information through the display 1900 by using a video codec and an audio codec.

The audio playing unit 1420 may play, according to control by the controller 1100, an audio source (for example, an audio file having a file extension that is mp3, wma, ogg, or way) stored in the storage unit 1800 of the electronic device 1000 or received from the outside by using the audio codec.

The audio playing unit 1420 may play, according to control by the controller 1100, an acoustic feedback (for example, an output of the audio source stored in the storage 1900, or the like), corresponding to an input received through the input/output unit 1600 by using the audio codec.

The video playing unit 1430 may play video data (for example, a video file having a file extension that is mpeg, mpg, mp4, avi, mov, or mkv) stored in the storage unit 1750 of the electronic device 1000 or received from the outside by using the video codec. An application executed in the electronic device 1000 may play audio data or video data by using the audio codec and/or the video codec. Also, a multimedia application executed in the electronic device 1000 may play the audio data and/or the video data by using a hardware codec and/or a software codec.

It may be easily understood by one of ordinary skill in the art that various kinds of video codecs and audio codecs are produced and sold depending on the kind of an audio/video file.

A still image or a video may be captured by the camera 1500. The camera 1500 may obtain an image frame of the still image or the video by using an image sensor. The image frame captured by the image sensor may be processed by the controller 1100 or a separate image processor. The processed image frame may be stored in the storage 1900 or may be transmitted to other devices through the communication interface 1300.

The camera 1500 may capture an image of a face of a user, and the controller 1100 may acquire a visual focus of the user based on the captured image. The controller 1100 may determine display content based on the visual focus of the user. For example, the controller may highlight a POI in an area where the visual focus is on.

The camera 1500 may include a first camera 1510 and a second camera 1520 which are located at different positions in the electronic device 1000. For example, the first camera 1510 may be located on a front surface of the electronic device 1000, and the second camera 1520 may be located on a rear surface of the electronic device 1000. For example, the first camera 1510 and the second camera 1520 may be located adjacent to each other on one surface of the electronic device 1000. For example, when the first camera 1510 and the second camera 1520 are located adjacent to each other on the one surface of the electronic device 1000, a 3D still image or a 3D video may be captured by using the first camera 1510 and the second camera 1520. The camera 1500 may further include a number of cameras in addition to the first and second cameras 1510 and 1520.

The camera 1500 may include a flashlight 1530 that provides an amount of light necessary for a photographing operation. Also, the camera 1500 may further include an additional lens, which may be detachably attached to a separate adaptor, for producing a wide angle photograph, telephoto photograph, and/or close-up photograph.

Data may be inputted to the electronic device 1000 through the input/output unit 1600, and data processed by the electronic device 1000 may be outputted through the input/output unit 1600.

The input/output unit 1600 may include at least one of a button 1610, a microphone 1620, a speaker 1630, and a vibration motor 1640, but is not limited thereto.

In other example embodiments, the input/output unit 1600 may include various input/output devices.

The button 1610 may be located on a front surface, a rear surface, or a side surface of the electronic device 1000. For example, the button 1610 may be a home button, a menu button, a return button, and/or the like located on a lower portion of the front surface of the electronic device 1000. The button 1610 may be a lock button, a volume button, and/or the like located on the side surface of the electronic device 1000.

The button 1610 may be implemented as touch buttons located on a bezel on the exterior of a touch screen.

When the electronic device 1000 is a smartwatch, the button 1610 may be a crown of the smartwatch.

An electrical signal may be generated based on a sound signal which is inputted through the microphone 1620 from the outside. The electrical signal generated by the microphone 1620 may be converted by the audio codec to be stored in the storage unit 1750 or to be outputted through the speaker 1630. The microphone 1620 may be located at any position such as the front surface, the side surface, the rear surface, or the like of the electronic device 1000. The electronic device 1000 may include a plurality of microphones. Various noise removal algorithms for removing noise occurring while an external sound signal is being received may be used.

A sound corresponding to various signals (for example, a radio signal, a broadcasting signal, an audio source, a video file, photographing, and/or the like) received by the communicator 1300, the multimedia unit 1400, the camera 1500, the input/output unit 1600, or the sensor 1700 and an audio source or a video source stored in the storage 1900, may be output to the outside of the electronic device 1000 through the speaker 1630.

The speaker 1630 may output a sound (for example, a touch sound corresponding to a phone number input or a photographing button sound) corresponding to a function performed by the electronic device 1000. The speaker 1630 may be located at any position such as the front surface, the side surface, the rear surface, or the like of the electronic device 1000. The electronic device 1000 may include a plurality of speakers.

The vibration motor 1640 may convert an electrical signal into a mechanical vibration. The vibration motor 1640 may include a linear vibration motor, a bar type vibration motor, a coin type vibration motor, or a piezoelectric vibration motor. The vibration motor 1640 may generate a vibration corresponding to an output of audio data or video data. The vibration motor 1640 may generate a vibration corresponding to various signals received by the communication interface 1300, multimedia unit 1400, camera 1500, input/output unit 1600, or sensor 1700.

The vibration motor 1640 may vibrate the electronic device 1000, or a part of the electronic device 1000. The electronic device 1000 may include two or more vibration motors.

The input/output unit 1600 may further include a touch pad, a connector, a keypad, a jog wheel, a jog switch, an input pen, and/or the like.

The touch pad may be embodied as a capacitive type, a resistive type, an infrared sensing type, a surface acoustic wave propagation type, integral strain gauge type, piezo-effect type, and electromagnetic resonance type, but is not limited thereto. The touch pad may construct a layer structure with the display 1800, or may be directly located on the display 1800, thereby functioning as a touch screen.

In an example embodiment, when the display 1900 is a touch screen that receives a touch input of a user, the controller 1100 may determine display brightness of pieces of content, based on a position of the received touch input. For example, when the display 1900 displays pieces of content, the controller 1900 may further reduce display brightness of content, which becomes farther away from a position of a received touch input, among the displayed pieces of content.

The touch pad may detect a proximity touch as well as a real-touch, both of which may be referred to as a touch.

The real touch may be made by bringing a pointer into contact with the touch pad, and the proximity touch may be made by bring the pointer closer to the touch pad.

The pointer denotes a touch instrument for the real touch or the proximity touch. For example, the pointer may be a stylus pen, a finger, etc.

The electronic device 1000 may further include a tactile sensor or a pressure detecting sensor for more precise sensing. The tactile sensor may detect various information such as a roughness of a contact surface, hardness of a contacting object, and a temperature at a contact point.

Pressure of touch may be sensed by the pressure detecting sensor. different functions may be performed Based on the pressure of touch.

Different functions may be performed based on gesture inputs. For example, the gesture inputs may include a tab input, a double tap input, a multiple tap input, a long tab input, a long tab input, a drag input, a swipe input, a pinch-out input, a pinch-in input, etc. For example, the gesture inputs may include a long tap that is applied for a certain period of time.

A drag input may be received by moving a pointer touched. A swipe input may be received by moving a pointer quickly.

A pinch-out input and pinch-in input may be received by moving two pointer touched.

A connector may be used as an interface for the electronic device 1000 and a power source connected each other. The electronic device 1000 may, according to control by the controller 1100, transmit data stored in the storage 1900 to other devices or receive data through a cable connected to the connector. Power may be applied to the electronic device 1000 through the cable connected to the connector, and a battery of the electronic device 1000 may be charged with the power. Also, the electronic device 1000 may be connected to an external accessory (for example, a speaker, a keyboard dock, and/or the like) through the connector.

Key inputs may be received by a keypad. For example, the keypad may be a virtual keypad displayed on a touch screen, a physical keypad.

The sensor 1700 may include at least one sensor for detecting a state of the electronic device 1000. For example, the sensor 1700 may include a proximity sensor 1710 that detects whether an object approaches to the electronic device 1000, an illuminance sensor 1720 that detects the amount of ambient light, and a gyro sensor 1730 that measures an angular speed with respect to each of the X axis, the Y axis, and the Z axis to measure a changed angle, but is not limited thereto.

The sensor 1700 may include a global positioning system (GPS) for detecting a location of the electronic device 1000. In an outdoor place, a location of the electronic device 1000 may be calculated by the GPS.

In an indoor place, the location of the electronic device 1000 may be calculated by using a wireless access point (AP). In the indoor place, the location of the electronic device 1000 may be calculated by a cell-identifier (cell-ID) method using an identifier of the AP, an enhanced cell-ID method further using received signal strength (RSS), or an angle of arrival (AoA) method using an angle at which a signal transmitted from the AP. In the indoor place, the location of the electronic device 1000 may be calculated by using a wireless beacon.

The sensor 1700 may include a magnetic sensor that detects azimuth by using an earth's magnetic field, an acceleration sensor that measures an angular speed (an acceleration of gravity and an acceleration of a motion) with respect to each of the X axis, the Y axis, and the Z axis, a gravity sensor that detects a direction where gravity acts, an RGB sensor that measures a concentration of red, green, blue, and white (RGBW) of lights, a hall sensor that senses a magnetic field, a magnetometer that measures an intensity of a magnetic field, an infrared (IR) sensor that senses a motion of a user's hands by using IR light, an altimeter that recognizes a gradient and measures atmospheric pressure to detect an elevation, a finger scan sensor, a heart rate sensor, a pressure sensor, ultraviolet (UV) sensor, a temperature humidity sensor, or a motion recognition sensor that recognizes a movement of a position of an object.

The storage 1900 may store various types of data and programs for controlling the electronic device 1000 according to control by the controller 1100. The storage 1900 may store a signal or data inputted/outputted and corresponded to controlling of the communication interface 1300, the input/output unit 1600, and the display 1900. For example, the storage 1900 may store data for a GUI associated with programs or applications, user information, documents, databases, and relevant data, but is not limited thereto.

The storage 1900 may include a non-volatile memory, a volatile memory, a hard disk drive (HDD), a solid state drive (SSD), etc. The storage may be referred to as a memory.

The display 1800 may include a plurality of pixels, and display information processed by the electronic device 1000. For example, a screen of an operating system, a screen of an application system executed in the operating system may be displayed on the display 1800. The controller 1100 may control display of a graphical user interface corresponding to various functions such as voice call, video call, data transmission, broadcasting reception, photographing, video play, application execution, etc.

The display 1800 may include at least one from among a liquid crystal display (LCD), a thin-film transistor-liquid crystal display (TFT-LCD), an organic light-emitting diode (OLED), a flexible display, a 3D display, an electrophoretic display, and a vacuum fluorescent display.

Furthermore, the electronic device 1000 may include two or more displays 1800 according to embodiments. The two or more displays may be disposed to face each other across a hinge.

Figure 23:
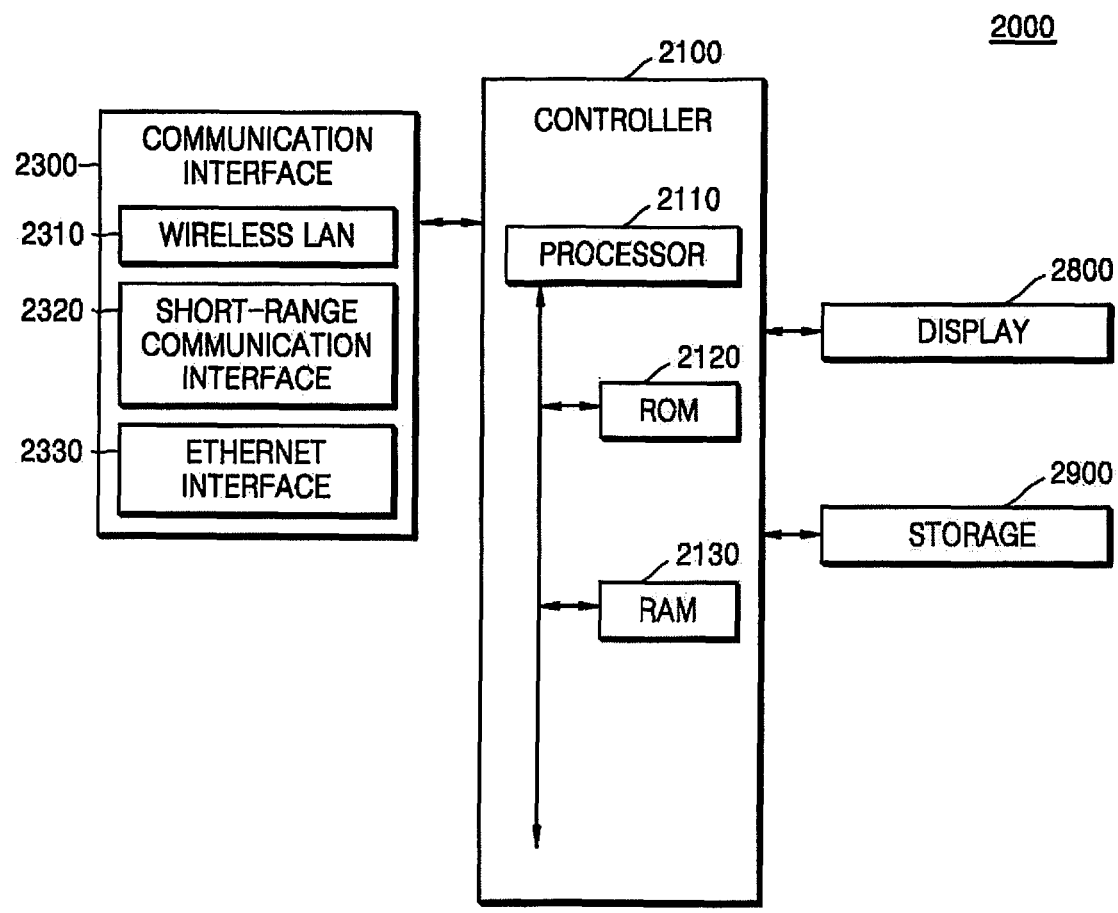

FIG. 23 illustrates an example server.

A server 2000 may receive text from the electronic device 1000 to determine a POI of a user in the received text and generate content corresponding to the determined POI and adaptive to the user, and then transmit the content to the electronic device 1000.

The controller 2100 may perform various functions of the electronic device 2000 by controlling overall operations of the electronic device 2000.

The server 2000 may communicate with other devices through the communication interface 2300.

The controller 2100 may determine a POI of a user in the received text, and generate content corresponding to the determined POI and adaptive to the user.

The determined POI and generated content may be transmitted to an external device through the communication interface 2300.

Figure 22:
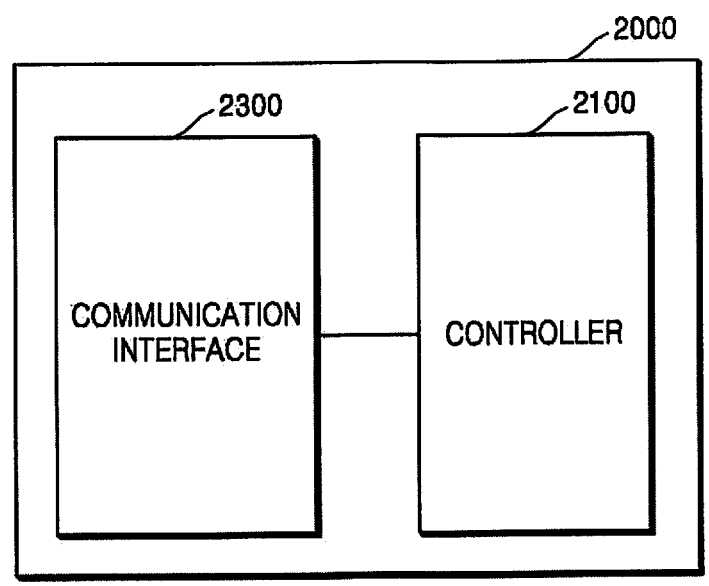
FIG. 22 and FIG. 23 illustrate an example server.

However, all the components shown in FIG. 22 are not essential components of the server 2000. The server 2000 may be embodied by more or less components than shown in FIG. 22. For example, as illustrated FIG. 23, the server 2000 may further include a storage 2900 and display 2800.

Details of each component of the electronic device 2000 are described below. An explanation of each component of the electronic device 1000 may be applied to components of the server 1000.

The controller 2100 may perform various functions of the electronic device 2000 by controlling overall operations of the electronic device 2000. For example, the controller 2100 may execute programs stored in the storage 2900 to control the communication interface 2300, storage 2900, and display 2800.

The server 2000 may communicate with an external device such as the electronic device 1000 through the communication interface 2300.

The communication interface 2300 may include a wireless LAN 2310, short range communication interface 2320, and an Ethernet interface 2330, but is not limited thereto. The communication interface 2300 may include one of a wireless LAN 2310, short range communication interface 2320, and an Ethernet interface 2330, or a combination thereof.

The storage 2900 may store various types of data and programs for controlling the server 2000 according to control by the controller 2100. The storage 2900 may store a signal or data inputted/outputted and corresponded to controlling of the communication interface 1300 and the display 1900.

Information processed by the server 2000 may be displayed on the display 2800. For example, a screen of an operating system, a screen of an application system executed in the operating system may be displayed on the display 2800.

The display 2800 may include at least one from among a LCD, a TFT-LCD, an OLED, a flexible display, a 3D display, an electrophoretic display, and a vacuum fluorescent display.

All references including publications, patent applications, and patents, cited herein, are hereby incorporated by reference to the same extent as if each reference were individually and specifically indicated to be incorporated by reference and were set forth in its entirety herein.

Various embodiments of the present disclosure may be embodied as on a non-transitory computer readable recording medium including computer readable codes such as a program module executable at a computer. A computer readable recording medium may be volatile, non-volatile, or a combination of volatile and non-volatile, where appropriate. The computer readable recording medium includes a computer storage medium and communication medium. The computer storage medium may include a computer readable instruction, a data structure, a program module, or any medium, but is not limited thereto. The communication medium may include any information transmission medium such as a carrier wave.

The exemplary embodiments may be represented using functional block components and various operations. Such functional blocks may be realized by any number of hardware and/or software components configured to perform specified functions. For example, the exemplary embodiments may employ various integrated circuit components, e.g., memory, processing elements, logic elements, look-up tables, and the like, which may carry out a variety of functions under control of at least one microprocessor or other control devices. As the elements of the exemplary embodiments are implemented using software programming or software elements, the exemplary embodiments may be implemented with any programming or scripting language such as C, C++, Java, assembler, or the like, including various algorithms that are any combination of data structures, processes, routines or other programming elements. Functional aspects may be realized as an algorithm executed by at least one processor. Furthermore, the exemplary embodiments may employ related techniques for electronics configuration, signal processing and/or data processing. The terms 'mechanism', 'element', 'means', 'configuration', etc. are used broadly and are not limited to mechanical or physical embodiments. These terms should be understood as including software routines in conjunction with processors, etc.

Embodiments of the present disclosure should be understood as examples, and should not be interpreted as limitations of the inventive concept. For the sake of brevity, related electronics, control systems, software development and other functional aspects of the systems may not be described in detail. Furthermore, the lines or connecting elements shown in the appended drawings are intended to represent exemplary functional relationships and/or physical or logical couplings between the various elements. It should be noted that many alternative or additional functional relationships, physical connections or logical connections may be present in a practical device. Moreover, no item or component is essential to the practice of the exemplary embodiments unless it is specifically described as "essential" or "critical."

The use of the terms "a", "an", and "the" and similar referents in the context of describing the exemplary embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. The operations of all methods described herein can be performed in an appropriate order unless otherwise indicated herein or otherwise clearly contradicted by context. The exemplary embodiments are not limited by an order in which the operations are described herein. The use of any and all examples, or exemplary language (e.g., "such as") provided herein, is intended merely to clearly describe the exemplary embodiments and does not pose a limitation on the exemplary embodiments unless otherwise claimed. Numerous modifications and adaptations will be readily apparent to those of ordinary skill in this art without departing from the spirit and scope of the exemplary embodiments.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. A method performed at a server, the method comprising:
    obtaining information regarding an e-mail transmitted to a user;
    collecting information regarding behavior of the user on an electronic device of the user, wherein the information regarding the e-mail and the information regarding the user's behavior are associated with an account of the user;
    determining at least one location and at least one date based on the information regarding the e-mail; and
    providing, to the user, transportation service content for providing transportation information related to the at least one location for the at least one date, accommodation service content for providing accommodation information related to the at least one location and the at least one date, and activity service content for providing activity information related to the at least one location and the at least one date, wherein the transportation service content, the accommodation service content, and the activity service content are displayed for the user as being arranged in a time sequence.

2. The method of claim 1, wherein the e-mail is transmitted to the user from another electronic device other than the electronic device of the user.

3. The method of claim 2, further comprising transmitting the e-mail to the user.

4. The method of claim 1, wherein determining the at least one location and the at least one date comprises determining the at least one location and the at least one date from a context of the e-mail.

5. The method of claim 1, wherein the transportation information includes information regarding a departure time, an arrival time, an origin, and a destination of a flight.

6. The method of claim 1, wherein a schedule for the at least one location and the at least one date is registered to a cloud schedule management application of the account.

7. The method of claim 1, wherein the e-mail is a reminder e-mail.

8. The method of claim 1, wherein the accommodation service content includes reservation service content for making a reservation of an accommodation at the at least one location for the at least one date.

9. The method of claim 1, wherein the transportation service content, the accommodation service content, and the activity service content constitute an itinerary of the user.

10. The method of claim 1, further comprising providing, to the user, a first indicator indicating whether transportation is booked, and a second indicator indicating whether accommodation is booked for the accommodation service content.

11. A server comprising:
a memory storing instructions;
at least one processor configured to execute the instructions which cause the at least one processor to:
obtain information regarding an e-mail transmitted to a user,
collect information regarding behavior of the user on an electronic device of the user, wherein the information regarding the e-mail and the information regarding the user's behavior are associated with an account of the user,
determine at least one location and at least one date based on the information regarding the e-mail, and
provide, to the user, transportation service content for providing transportation information related to the at least one location for the at least one date, accommodation service content for providing accommodation information related to the at least one location and the at least one date, and activity service content for providing information about an activity related to the at least one location and the at least one date, wherein the transportation service content, the accommodation service content, and the activity service content are displayed for the user as being arranged in a time sequence.

12. A method performed at an electronic device, the method comprising:
obtaining information regarding user behavior on the electronic device of a user, wherein the information regarding the user behavior and information regarding an e-mail transmitted to the user are associated with an account of the user;
accessing a server that provides content; and
displaying, in a time sequence, transportation service content for providing transportation information related to at least one location for at least one date, accommodation service content for providing accommodation information related to the at least one location and the at least one date, and activity service content for providing information about an activity related to the at least one location and the at least one date,
wherein the transportation service content, the accommodation service content, and the activity service content are provided by the server, and
wherein the at least one location and the at least one date are determined based on the information regarding the e-mail.

13. The method of claim 12, wherein the e-mail is transmitted to the user from another electronic device other than the electronic device of the user.

14. The method of claim 12, wherein the information about the transportation includes information regarding a departure time, arrival time, origin, and destination of a flight.

15. The method of claim 12, wherein a schedule for the at least one location and the at least one date are registered to a cloud schedule management application of the account.

16. The method of claim 12, wherein the e-mail is a reminder e-mail.

17. The method of claim 12, wherein the accommodation service content includes reservation service content for making a reservation of the accommodation at the location for the date.

18. The method of claim 12, wherein the transportation service content, the accommodation service content, and the activity service content constitute an itinerary of the user.

19. The method of claim 12, further comprising displaying a first indicator indicating whether the transportation is booked, and a second indicator indicating whether the accommodation is booked for the accommodation service content.

20. A computer program product comprising a non-transitory computer-readable recording medium having recorded thereon a program executable by a computer for performing the method of claim 12.

* * * * *